US012103287B2

(12) United States Patent
Detloff et al.

(10) Patent No.: US 12,103,287 B2
(45) Date of Patent: Oct. 1, 2024

(54) METHOD AND SYSTEM OF PRODUCING A PLURALITY OF ANALYTICAL TEST STRIPS

(71) Applicant: Roche Diagnostics Operations, Inc., Indianapolis, IN (US)

(72) Inventors: Andreas Detloff, Walldorf (DE); Egon Humbek, Dirmstein (DE); Artur Letkemann, Hessheim (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 13 days.

(21) Appl. No.: 17/806,863

(22) Filed: Jun. 14, 2022

(65) Prior Publication Data

US 2022/0305766 A1    Sep. 29, 2022

Related U.S. Application Data

(63) Continuation of application No. PCT/EP2020/087036, filed on Dec. 18, 2020.

(30) Foreign Application Priority Data

Dec. 19, 2019  (EP) ..................................... 19217795

(51) Int. Cl.
    *B32B 37/02*    (2006.01)
    *B32B 37/00*    (2006.01)
    (Continued)

(52) U.S. Cl.
    CPC .......... *B32B 37/02* (2013.01); *B32B 37/0053* (2013.01); *B32B 38/0004* (2013.01);
    (Continued)

(58) Field of Classification Search
    CPC . B32B 37/02; B32B 37/0053; B32B 38/0004; B32B 38/185; B32B 2041/04;
    (Continued)

(56) References Cited

U.S. PATENT DOCUMENTS

| 4,610,739 A | 9/1986 | Jensen |
| 2003/0152740 A1 | 8/2003 | van der Pluym et al. |

(Continued)

FOREIGN PATENT DOCUMENTS

| CN | 101095099 A | 12/2007 |
| CN | 102326233 A | 1/2012 |

(Continued)

OTHER PUBLICATIONS

International Search Report issued Mar. 23, 2021 in Application No. PCT/EP2020/087036, 2 pp.

*Primary Examiner* — George R Koch
(74) *Attorney, Agent, or Firm* — Woodard, Emhardt, Henry, Reeves & Wagner, LLP

(57) ABSTRACT

A method of producing a plurality of analytical test strips using a reel-to-reel process, comprising providing at least one continuous first layer web, having disposed on a first side at least one first electrode layer, the first layer web having a first layer edge; continuously disposing at least one continuous spacer layer web onto the first side of the first layer web, wherein the spacer layer web has a spacer layer edge, wherein the disposing is position-controlled in a master-slave fashion by using a position of the first layer edge as a master position and a position of the spacer layer edge as a slave position; and continuously disposing at least one continuous second layer web onto the spacer layer web, the second layer web having disposed on a first side at least one second electrode layer, wherein the second layer web has a second layer edge.

19 Claims, 4 Drawing Sheets

(51) Int. Cl.
*B32B 38/00* (2006.01)
*B32B 38/18* (2006.01)
*B32B 41/00* (2006.01)
*G01N 27/327* (2006.01)

(52) U.S. Cl.
CPC ....... *B32B 38/185* (2013.01); *G01N 27/3272* (2013.01); *B32B 2041/04* (2013.01); *B32B 2309/105* (2013.01); *B32B 2429/00* (2013.01)

(58) Field of Classification Search
CPC .......... B32B 2309/105; B32B 2429/00; G01N 27/3272
See application file for complete search history.

(56) References Cited

U.S. PATENT DOCUMENTS

| | | | |
|---|---|---|---|
| 2006/0137813 A1 | 6/2006 | Robrecht et al. | |
| 2007/0141436 A1 | 6/2007 | Mekala et al. | |
| 2007/0278097 A1* | 12/2007 | Bhullar | G01N 27/3272 219/121.64 |
| 2012/0273112 A1* | 11/2012 | Dagenbach | B31D 1/021 156/64 |
| 2013/0068369 A1 | 3/2013 | Mann et al. | |
| 2015/0233889 A1* | 8/2015 | Dick | G01N 33/487 118/610 |
| 2015/0245954 A1* | 9/2015 | Varga | B32B 41/00 156/64 |

FOREIGN PATENT DOCUMENTS

| | | |
|---|---|---|
| CN | 106604819 A | 4/2017 |
| CN | 107072847 A | 8/2017 |
| CN | 107108140 A | 8/2017 |
| DE | 102015221661 A1 | 5/2017 |
| DE | 102015221663 A1 | 5/2017 |
| EP | 0734968 A1 | 10/1996 |
| EP | 2907573 A1 | 8/2015 |
| JP | H0245851 | 2/1990 |
| JP | 2006504945 | 2/2006 |
| JP | 2006504946 | 2/2006 |
| JP | 2007216343 | 8/2007 |
| JP | 2012524568 | 10/2012 |
| JP | 2016521856 | 7/2016 |
| WO | 2007/149948 A2 | 12/2007 |
| WO | 2010/078414 A2 | 7/2010 |
| WO | 2016/034569 A1 | 3/2016 |
| WO | 2016/040090 A1 | 3/2016 |
| WO | 2016/109205 A1 | 7/2016 |
| WO | 2019/106322 A1 | 6/2019 |

* cited by examiner

METHOD AND SYSTEM OF PRODUCING A PLURALITY OF ANALYTICAL TEST STRIPS

CROSS-REFERENCE TO RELATED APPLICATIONS

This application is a continuation of International Patent Application No. PCT/EP2020/087036, filed 18 Dec. 2020, which claims priority to European Patent Application No. 19217795.4, filed 19 Dec. 2019, the disclosures of which are hereby incorporated by reference in their entirety.

TECHNICAL FIELD

The present application refers to a method of producing analytical test strips by using a reel-to-reel process. The present disclosure further relates to a manufacturing system for producing a plurality of analytical test strips by using a reel-to-reel process.

BACKGROUND

In the field of medical technology and diagnostics, in general, test strips, such as analytical test strips, may be used for detecting at least one analyte present in samples of one or more of a body tissue and a body fluid and/or bodily fluid, such as in blood, interstitial fluid, urine, saliva or other types of bodily fluids. Example of analytes to be detected are glucose, ketones, triglycerides, lactate, cholesterol or other types of analytes typically present in these bodily fluids. According to the concentration and/or presence of the analyte, an appropriate treatment may be chosen, if necessary.

Generally, methods and systems of producing a plurality of analytical test strips known to the skilled person make use of reel-to-reel processes. Typically, such reel-to-reel processes may be used for printing, e.g., in the printing industry.

In the field of medical technology and diagnostics, specifically when producing analytical test strips, different requirements regarding the manufacturing process may apply, in particular in view of precision, safety and hygiene, compared to common manufacturing processes, such as manufacturing processes as used in the printing industry. Thus, when producing analytical test strips, manufacturing processes typically have to meet high demands on precision and hygiene. As an example, in order to avoid contamination, generally, touching of sensitive surfaces may be limited to a minimum. Thus, non-contact detection of the position of a moving strip of material may be typical over contact position detection.

Thus, despite the progress that has been made, e.g., with the above-mentioned concepts, several technical challenges remain. Specifically, detection of faulty or non-ideal sections in the reel-to-reel production process of analytical test elements, so far, are generally detected with a high temporal offset, such that more material may be discarded than necessary. Further, the common approach of material transportation between two driven rollers generally may increase the risk of damage and contamination. Furthermore, when using more than one or even more than two layers, accuracy and preciseness of relative positioning are generally challenging. So far, common edge detection sensors used in known processes typically reach their limits when approaching accuracy of <0.01 mm. Thus, in general, improving safety and manufacturing accuracy and precision may be desirable. Further, improving accuracy and minimizing time delays in a correction of faulty positions and/or misalignments generally may be desirable. Thus, a high-precision direct error correction may be targeted.

It is therefore desirable to provide methods and systems which address the above mentioned technical challenges of producing a plurality of analytical test strips. Specifically, methods and systems shall be proposed which are suited to improve safety and manufacturing accuracy.

SUMMARY

Although the embodiments of the present disclosure are not limited to specific advantages or functionality, it is noted that in accordance with the present disclosure a plurality of analytical test strips can be provided by using a reel-to-reel process.

In a first aspect, a method of producing a plurality of analytical test strips by using a reel-to-reel process is disclosed. Each analytical test strip comprises at least one first layer having at least one first electrode, at least one spacer layer and at least one second layer having at least one second electrode. The method comprises the following steps, which, as an example, may be performed in the given order. It shall be noted, however, that a different order is also possible. Further, it is possible to perform one or more or even all of the method steps once or repeatedly. Further, it is possible to perform two or more of the method steps simultaneously or in a timely overlapping fashion. The method may comprise additional method steps, which are not listed.

In accordance with one embodiment of the present disclosure, a method of producing a plurality of analytical test strips by using a reel-to-reel process is provided, each analytical test strip comprising at least one first layer having at least one first electrode, at least one spacer layer and at least one second layer having at least one second electrode, the method comprising:

i. providing at least one continuous first layer web, having disposed on a first side at least one first electrode layer, the first layer web having a first layer edge;

ii. continuously disposing, in at least one first lamination station, at least one continuous spacer layer web onto the first side of the first layer web, wherein the spacer layer web has a spacer layer edge, wherein the disposing is position-controlled in a master-slave fashion by using a position of the first layer edge as a master position and a position of the spacer layer edge as a slave position, wherein the disposing takes place such that the spacer layer edge is offset from the first layer edge and that, thereby, a portion of the first side of the first layer and a portion of the first electrode layer remain uncovered by the spacer layer web; and iii. continuously disposing, in at least one second lamination station, at least one continuous second layer web onto the spacer layer web, the second layer web having disposed on a first side at least one second electrode layer, wherein the disposing is performed such that the second electrode layer faces the first layer web, wherein the second layer web has a second layer edge, wherein the disposing takes place such that the second layer edge is aligned with the first layer edge and wherein the disposing is position-controlled in a master-slave fashion by using a position of the second layer edge as a slave position; wherein in the master-slave fashion the slave position is adapted according to the master position.

In accordance with another embodiment of the present disclosure, a manufacturing system for producing a plurality of analytical test strips by using a reel-to-reel process is provided, each analytical test strip comprising at least one first layer having at least one first electrode, at least one spacer layer and at least one second layer having at least one second electrode, the manufacturing system comprising:

I. at least one supplying device for providing at least one continuous first layer web, the first layer web having disposed on a first side at least one first electrode layer, the first layer web having a first layer edge;

II. at least one first lamination station, the first lamination station being configured for continuously disposing at least one continuous spacer layer web onto the first side of the first layer web, wherein the spacer layer web has a spacer layer edge, wherein the disposing is position-controlled in a master-slave fashion by using a position of the first layer edge as a master position and a position of the spacer layer edge as a slave position, wherein the disposing takes place such that the spacer layer edge is offset from the first layer edge and that, thereby, a portion of the first side of the first layer and a portion of the first electrode layer remain uncovered by the spacer layer web; and III. at least one second lamination station, the second lamination station being configured for continuously disposing at least one continuous second layer web onto the spacer layer web, the second layer web having disposed on a first side at least one second electrode layer, wherein the disposing is performed such that the second electrode layer faces the first layer web, wherein the second layer web has a second layer edge, wherein the disposing takes place such that the second layer edge is aligned with the first layer edge, and wherein the disposing is position-controlled in a master-slave fashion by using a position of the second layer edge as a slave position; wherein in the master-slave fashion the slave position is adapted according to the master position.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numbers and in which.

Figure 1:
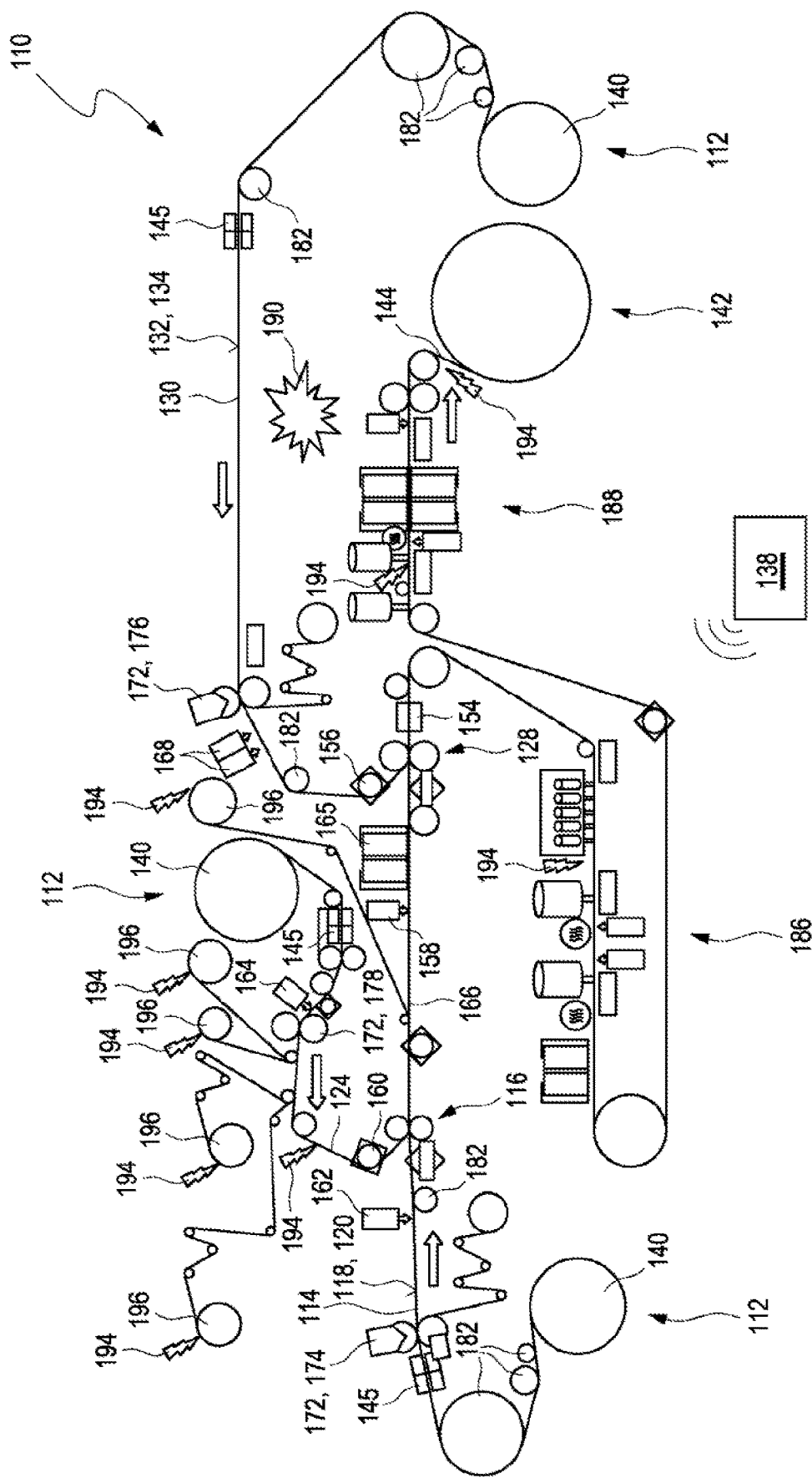
FIG. 1 shows a schematic illustration of an embodiment of a manufacturing system.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

The term "producing" as used herein is a broad term and is to be given its ordinary and customary meaning to a person of ordinary skill in the art and is not to be limited to a special or customized meaning. The term specifically may refer, without limitation, to a process of manufacturing. Specifically, producing a plurality of analytical test strips may refer to a processing of at least one element and/or component in such as manner as to retrieve the plurality of analytical test strips.

The term "analytical test strip" as used herein is a broad term and is to be given its ordinary and customary meaning to a person of ordinary skill in the art and is not to be limited to a special or customized meaning. The term specifically may refer, without limitation, to an element or device configured for detecting an analyte or determining the concentration of an analyte in a liquid sample, such as in a bodily fluid, specifically in a sample of a bodily fluid. The analytical test strip may also be referred to as test strip or test element. As an example, the analytical test strip may comprise at least one component, which changes at least one detectable property when the analyte is present in the bodily fluid. The analytical test strip specifically may be suited for an in-vitro measurement. The analytical test strip specifically may be an electrochemical test strip.

The term "analyte" as used herein is a broad term and is to be given its ordinary and customary meaning to a person of ordinary skill in the art and is not to be limited to a special or customized meaning. The term specifically may refer, without limitation, to an arbitrary chemical, biochemical or biological substance, component or compound, such as a molecule, e.g., glucose, triglycerides, lactate or cholesterol. In particular, the term "analyte" may also refer to a detectable property of a sample, such as within a sample of bodily fluid. Thus, the analyte may specifically refer to at least one parameter of the sample, e.g., of the sample of bodily fluid. Therein, the term "parameter" generally may refer to an arbitrary value such as a measurement value, which is obtainable within or by an analytical test. Exemplarily, the parameter may correspond to a property of the sample and/or a property of the at least one analyte as described above. Specifically, the parameter may be a coagulation parameter such as to a coagulation time of the analyte.

The term "bodily fluid" as used herein is a broad term and is to be given its ordinary and customary meaning to a person of ordinary skill in the art and is not to be limited to a special or customized meaning. The term may specifically refer, without limitation, to an arbitrary liquid body fluid which is present in a body tissue of a human or animal, such as in an interstitial tissue. As an example, the bodily fluid may be or may comprise one or more of blood, interstitial fluid, urine, saliva or the like.

The term "reel-to-reel-process" as used herein is a broad term and is to be given its ordinary and customary meaning to a person of ordinary skill in the art and is not to be limited to a special or customized meaning. The term specifically may refer, without limitation, to a process involving at least two turning and/or rotating objects, such as at least two rotating wheels and/or rolls. The reel-to-reel process may specifically comprise transferring at least one element stored on a first roll, such as an element having a sheet form and/or tape form, onto the second roll, wherein at least one processing step is performed during the transfer. Thus, as an example, the reel-to-reel-process may refer to an arbitrary process starting with a roll of material, e.g., with the first roll, and re-reeling after performing the process, such as into an output roll, e.g., into the second roll. The reel-to-reel-process may also be referred to as roll-to-roll-process.

The term "layer" as used herein is a broad term and is to be given its ordinary and customary meaning to a person of ordinary skill in the art and is not to be limited to a special or customized meaning. The term specifically may refer, without limitation, to an arbitrary aliquot of material forming a sheet or film, either as a standalone film or as a film deposited on a substrate. The layer may specifically be arranged in at least one bundle of a plurality of layers, such as in a stack and/or multilayered element, wherein at least one layer may be placed and/or laid upon or below at least one other layer. The analytical test strip comprises at least two layers, these layers being referred to as the "first layer" and the "second layer", wherein the terms "first" and "second" are used for the purpose of nomenclature, only, without ranking or numbering the layers and without giving any preferences.

In general, the terms "first" and "second" as used herein are used for the purpose of nomenclature, only, without intention of ranking or numbering and without giving any preferences.

As used herein, the term "spacer layer" may refer to an arbitrary layer having a predefined thickness. The spacer layer may specifically be configured for being positioned between at least two other layers, such as for allowing a relative positioning of said other two layers. In particular, the spacer layer may allow a relative positioning of the at least two other layers with at least one minimum distance, wherein the minimum distance may specifically be greater or equal to the thickness of the spacer layer.

The term "electrode" as used herein is a broad term and is to be given its ordinary and customary meaning to a person of ordinary skill in the art and is not to be limited to a special or customized meaning. The term specifically may refer to an electrical conductor, such as at least one conductive material, e.g., a conductive metal or carbon. Thus, a layer having at least one electrode may specifically refer to a layer comprising at least one electrical conductor. For example, the electrical conductor may be arranged on at least one side of the layer, such as a thin layer and/or film of conductive material, e.g., a conductive metal, e.g., gold, or carbon, being arranged and/or placed on the at least one side of the layer. Specifically, the term "electrode layer" may refer to a layer of the electrode, such as to a layer of conductive material. Herein, the electrode layers may be referred to as "first electrode layer" and "second electrode layer", wherein the term "first" and "second", again, are used for the purpose of nomenclature, only, without ranking or numbering these layers and without giving any preferences.

The term "providing" as used herein is a broad term and is to be given its ordinary and customary meaning to a person of ordinary skill in the art and is not to be limited to a special or customized meaning. The term specifically may refer, without limitation, to an arbitrary process of supplying and/or making available. In particular, in step i) at least one continuous layer web may be provided, e.g., supplied. As an example, in step i) the at least one continuous first layer web may be provided, such as supplied and/or made available, to the first lamination station as disclosed in further detail below.

The term "layer web" as used herein is a broad term and is to be given its ordinary and customary meaning to a person of ordinary skill in the art and is not to be limited to a special or customized meaning. The term specifically may refer, without limitation, to a raw and/or preprocessing state of the layer. In particular, the layer web may be or may comprise an unprocessed layer of material, for example provided on a roll or reel. In particular, the layer web may refer to a thin sheet and/or plate and/or strip of arbitrary material. The layer web may specifically be provided in a continuous form, such as on a roll and/or reel. Herein, the layer webs may be referred to as "first layer web" and "second layer web", wherein the term "first" and "second", again, are used for the purpose of nomenclature, only, without ranking or numbering these layer webs and without giving any preferences.

As used herein, the term "continuous" is a broad term and is to be given its ordinary and customary meaning to a person of ordinary skill in the art and is not to be limited to a special or customized meaning. The term specifically may refer, without limitation, to a characteristic and/or form of being uninterrupted and/or perpetual. Thus, as an example, the continuous layer web may be provided by appending and/or extending a layer web for example provided on a reel and/or bobbin, such as in a roll of layer web, with a following layer web, e.g., also provided on a reel and/or bobbin, thereby allowing for an uninterrupted and/or perpetual availability of the layer web. As an example, for providing the continuous layer web, at least one splicing station may be used for appending and/or extending the layer web. In particular, the continuous layer web may be or may comprise a plurality of appended rolls of layer web, such as coiled and/or reeled up amounts of layer web.

The term "layer edge" as used herein is a broad term and is to be given its ordinary and customary meaning to a person of ordinary skill in the art and is not to be limited to a special or customized meaning. The term specifically may refer, without limitation, to a rim and/or border of the layer. In particular, the layer edge may be arranged on an end of a width of the layer web, such as on at least one side of the layer web. Herein, the layer edges may be referred to as "first layer edge" and "second layer edge", wherein the term "first" and "second", again, are used for the purpose of nomenclature, only, without ranking or numbering these layer edges and without giving any preferences.

The term "continuously disposing" as used herein is a broad term and is to be given its ordinary and customary meaning to a person of ordinary skill in the art and is not to be limited to a special or customized meaning. The term specifically may refer, without limitation, to a process of uninterrupted and/or incessant placing and/or positioning of one arbitrary material onto another arbitrary material.

The term "lamination station" as used herein is a broad term and is to be given its ordinary and customary meaning to a person of ordinary skill in the art and is not to be limited to a special or customized meaning. The term specifically may refer, without limitation, to a device and/or system configured for laminating at least two layers. Therein the term "laminate" is a broad term and is to be given its ordinary and customary meaning to a person of ordinary skill in the art and is not to be limited to a special or customized meaning. The term specifically may refer, without limitation, to a process of joining at least two layers. In particular, when laminating the at least two layers in the lamination station at least one combined layer, such as a layer comprising the at least two joined layers, may be generated.

The term "spacer layer web" as used herein is a broad term and is to be given its ordinary and customary meaning to a person of ordinary skill in the art and is not to be limited to a special or customized meaning. The term specifically may refer, without limitation, to a raw and/or preprocessing state of the spacer layer. In particular, the spacer layer web may be or may comprise an unprocessed layer of spacer material, e.g., of a material having a predefined thickness, for example provided on a roll or reel. In particular, the spacer layer web may refer to a thin sheet and/or plate and/or strip of arbitrary spacer material. The spacer layer web may specifically be provided in a continuous form, such as on a roll and/or reel.

The term "spacer layer edge" as used herein is a broad term and is to be given its ordinary and customary meaning to a person of ordinary skill in the art and is not to be limited to a special or customized meaning. The term specifically may refer, without limitation, to a rim and/or border of the spacer layer. In particular, the spacer layer edge may be arranged on an end of a width of the spacer layer web, such as on at least one side of the spacer layer web.

The term "position" as used herein is a broad term and is to be given its ordinary and customary meaning to a person of ordinary skill in the art and is not to be limited to a special or customized meaning. The term specifically may refer, without limitation, to a location in space. The position of an arbitrary object may, for example, be or may comprise spatial information on the object, and may for example be given in a coordinate system.

The term "position controlled" as used herein is a broad term and is to be given its ordinary and customary meaning to a person of ordinary skill in the art and is not to be limited to a special or customized meaning. The term specifically may refer, without limitation, to a process of guiding and/or influencing a position, such as a position of an arbitrary object. Thus, the guiding and/or influencing specifically may take place in such a way that an actual value of the position is compared with a target value of the position, and an influencing and/or guiding takes place in order to one or more of reduce, minimize or eliminate the deviation. In particular, a position controlled disposing of an arbitrary object may refer to a process of placing and/or positioning of the object being influenced and/or adapted due to the location of the object. As an example, the position may be controlled by following a predefined rule and/or sequence. Specifically, the disposing may be position controlled in a master-slave fashion.

The term "master-slave fashion" as used herein is a broad term and is to be given its ordinary and customary meaning to a person of ordinary skill in the art and is not to be limited to a special or customized meaning. The term specifically may refer, without limitation, to a rule and/or sequence to be followed when controlling the position, wherein a slave position is configured to be adapted according to a master position. Thus, in the master-slave fashion, as an example, the slave position may be controlled dependent on the master position. The term "master position" may be or may comprise the position of an arbitrary leading and/or dominant object, whereas the term "slave position" may be or may comprise the position of an arbitrary following and/or subdominant object. In particular, in the master-slave fashion, the slave position may be adapted according to the master position.

The term "offset" as used herein is a broad term and is to be given its ordinary and customary meaning to a person of ordinary skill in the art and is not to be limited to a special or customized meaning. The term specifically may refer, without limitation, to a displacement, such as a predefined displacement, such as to a predefined distance, between at least two values, objects or elements.

The terms "align" and/or "aligning" as used herein is a broad term and is to be given its ordinary and customary meaning to a person of ordinary skill in the art and is not to be limited to a special or customized meaning. The term specifically may refer, without limitation, to a process of relative positioning at least two objects and/or elements in line and/or parallel. Thus, the second layer edge being aligned with the first layer edge may refer to the second layer edge and the first layer edge being positioned in a parallel fashion, such as in one line.

As an example, step iii. may be performed such that the position of the first layer edge may be used as a master position. Thus, in step iii. the position of the first layer edge may be used as the leading position.

The method may further comprise detecting an alignment between the second layer edge and the first layer edge, specifically by using at least one alignment sensor downstream the second lamination station. In particular, the method may further comprise detecting, by using the at least one alignment sensor downstream the second lamination station, the alignment between the second layer edge and the first layer edge and controlling a position of the second layer edge of the continuous second layer web being fed into the second lamination station. Thus, the method may comprise controlling a position of the second layer edge of the continuous second layer web being fed into the second lamination station, by using, for example, the at least one alignment sensor for detecting the alignment.

The term "detecting" as used herein is a broad term and is to be given its ordinary and customary meaning to a person of ordinary skill in the art and is not to be limited to a special or customized meaning. The term specifically may refer, without limitation, to a process of qualitatively and/or quantitatively determining an existence of an element and/or object to be detected. Specifically, detecting an alignment may refer to a process of determining and/or monitoring an alignment between at least two objects and/or elements. In particular, an alignment may be detected by using an alignment sensor.

The term "sensor" as used herein is a broad term and is to be given its ordinary and customary meaning to a person of ordinary skill in the art and is not to be limited to a special or customized meaning. The term specifically may refer, without limitation, to an arbitrary element configured for one or more of detecting, measuring or monitoring at least one measurement variable or measurement property. Specifically, the sensor may be capable of generating at least one signal, such as a measurement signal, e.g., an electrical signal, which is a qualitative or quantitative indicator of the measurement variable and/or measurement property.

The term "alignment sensor" as used herein is a broad term and is to be given its ordinary and customary meaning to a person of ordinary skill in the art and is not to be limited to a special or customized meaning. The term specifically may refer, without limitation, to a sensor configured for determining and/or detecting an alignment between at least two elements and/or objects.

The alignment sensor may specifically be located and/or arranged downstream the second lamination station. Therein the term "downstream" may refer to a specification of a sequence and/or order of performance. Specifically, a step being arranged downstream a reference step may refer to the step being performed after the performing of the reference step. Thus, the alignment sensor may be located and/or arranged such as to perform a detecting of the alignment between the second layer edge and the first layer edge subsequent to the first layer edge and the second layer edge, e.g., the first layer web and the second layer web, passing the lamination station. In particular, the detecting of the alignment may be performed after the layer webs may have passed the second lamination station. Thus, as an example, the alignment sensor may be located and/or positioned after and/or behind the second lamination station.

The alignment sensor may comprise at least one optical distance sensor. The term "optical distance sensor" as used herein is a broad term and is to be given its ordinary and customary meaning to a person of ordinary skill in the art and is not to be limited to a special or customized meaning. The term specifically may refer, without limitation, to a sensor being configured for determining and/or measuring at least one distance and/or at least one position of an arbitrary object and/or element by using at least one optical method. In particular, the optical distance sensor may optically measure and/or determine the at least one position of the object and/or element.

Specifically, the optical distance sensor may have a sensing direction essentially parallel to a plane of extension of the first layer web. In particular, the sensing direction as used herein may refer to a direction of view, such as to an optical viewing axis of the optical distance sensor. As used herein, the term "essentially parallel" is a broad term and is to be given its ordinary and customary meaning to a person of ordinary skill in the art and is not to be limited to a special or customized meaning. The term specifically may refer, without limitation, to an orientation that may differ from a parallel orientation by no more than 10°, specifically by no more than 5°, more specifically by no more than 3°. In particular, the optical distance sensor may, for example, have a sensing direction onto and/or perpendicular to the first layer edge and the second layer edge and typically, also the spacer layer edge.

The alignment sensor may comprise at least one laser sensor, specifically a laser profile sensor. The term "laser sensor" as used herein is a broad term and is to be given its ordinary and customary meaning to a person of ordinary skill in the art and is not to be limited to a special or customized meaning. The term specifically may refer, without limitation, to a sensor being configured for determining and/or measuring at least one position of at least one object and/or element by using at least one laser.

The alignment sensor may specifically be configured for simultaneously detecting a position of the first layer edge, the spacer layer edge and the second layer edge.

In particular, the alignment sensor may be a superordinate sensor, such as a sensor of a higher hierarchy, e.g., a king sensor and/or a master of masters sensor. Thus, as an example, the alignment determined and/or detected by the alignment sensor may be used as a superordinate position, such as a king and/or master of masters position in the master-slave fashion position control. Specifically, the at least one signal generated by the alignment sensor, such as in form of an electrical signal, on the alignment position, e.g., on the alignment between the second layer edge and the first layer edge and typically also the spacer layer edge, may be used as a superordinate signal, e.g., a master of masters signal and/or a king of masters signal, according to which the master position, such as the position of the first layer edge, may be adapted. As an example, the alignment determined and/or detected by the alignment sensor, such as by the alignment sensor located and/or arranged downstream the second lamination station, may be used as a superordinate position information according to which any one or even both of the master position and the slave position may be adapted. Thus, in detail, the alignment sensor, e.g., located and/or arranged downstream the second lamination station, may be a superordinate sensor and may thus function as a control mechanism for monitoring and/or controlling the positioning of one or more or even all of the first layer web, the second layer web and the spacer layer web.

A deviation in alignment between the first layer edge and the second layer edge may at least partially be corrected by correcting the position of the second layer edge of the continuous second layer web being fed into the second lamination station. As an example, the correcting of the position of the second layer edge may be performed automatically. In particular, the automatic correction of the position of the second layer edge may be performed by a computer, such as without any action being required from a human.

The correcting of the position of the second layer edge may specifically comprise tilting at least one roller over which the continuous second layer web is fed into the second lamination station. The term "tilting" as used herein is a broad term and is to be given its ordinary and customary meaning to a person of ordinary skill in the art and is not to be limited to a special or customized meaning. The term specifically may refer, without limitation, to a process of moving and/or inclining. Thus, the term "tilting a roller" as used herein specifically may refer, without limitation, to a process of moving and/or inclining at least one roller, such as a pulley and/or reel. In particular, the roller may be or may comprise a cylindrical shape and may be configured for guiding the layer web, specifically the second layer web. As an example, the roller, e.g., a cylindrical roller, may be configured for changing a position of the layer web along an axis of the roller by tilting the roller by means of at least one controllable motor. In particular the motor may be configured to act on the movement of the roller via at least one spindle and/or shaft. As an example, the spindle and/or shaft may have a pitch of 1 mm. The roller may specifically be or may comprise an anti-slip surface.

The position-controlled disposing in steps ii. and iii. may be a position-controlled disposing with respect to a position perpendicular to a direction of transport direction of the webs. In particular, the disposing may be position-controlled by shifting and/or moving the webs in a direction perpendicular to a direction of transport, such as to a travelling direction of the webs. In particular, as an example, the travelling direction of the webs may be changed axially to the left or to the right by tilting the roller.

The method may further comprise detecting, by using at least one offset sensor downstream the first lamination station, an offset between the spacer layer edge and the first layer edge and controlling a position of the spacer layer edge of the continuous spacer layer web being fed into the first lamination station. The term "offset sensor" as used herein is a broad term and is to be given its ordinary and customary meaning to a person of ordinary skill in the art and is not to be limited to a special or customized meaning. The term specifically may refer, without limitation, to a sensor being configured for determining and/or measuring at least one offset of at least one object and/or element with respect to another, such as at least one offset between at least two objects and/or elements.

The offset sensor may specifically comprise at least one image recognition device configured for continuous image recognition of a camera image in a direction of view transverse to the plane of extension of the first layer web. Specifically, the image recognition device of the offset sensor may be configured for continuous image recognition of a camera image in a direction of view transverse and/or perpendicular to the direction of travel and/or transport of the webs, specifically of the first layer web. The term "image recognition device" as used herein is a broad term and is to be given its ordinary and customary meaning to a person of ordinary skill in the art and is not to be limited to a special or customized meaning. The term specifically may refer, without limitation, to an object and/or element configured for detecting and/or determining objects in an image. In particular, the image recognition device may be configured for using image recognition techniques and/or methods generally known to the skilled person, such as by recognizing the shape or border lines of at least one web, e.g., of the first layer web.

The offset may specifically be compared with at least one nominal offset, such as with at least one predefined offset and/or target offset. In particular, deviations between the offset and the nominal offset may at least partially be corrected by correcting the position of the spacer layer edge of the continuous spacer layer web being fed into the first lamination station. As an example, correcting the position of the spacer layer edge may specifically comprise tilting at least one roller over which the spacer layer web is fed into the first lamination station.

The method may further comprise detecting, by using at least one first layer sensor, the position of the first layer edge of the continuous first layer web being fed into the first lamination station. The first layer sensor may comprise at least one infrared sensor. In particular, the first layer sensor may specifically comprise at least one infrared sensor having a sensing direction transverse to a plane of extension of the first layer web. The term "infrared sensor" as used herein is a broad term and is to be given its ordinary and customary meaning to a person of ordinary skill in the art and is not to be limited to a special or customized meaning. The term specifically may refer, without limitation, to a sensor being configured for determining and/or measuring at least one position of at least one object and/or element by using infrared light, such as light emitted in an infrared spectrum, e.g., light having wavelengths $\lambda$ with 700 nm$\leq\lambda\leq$1 mm, specifically with 700 nm$\leq\lambda\leq$30 μm.

Additionally or alternatively, a vacuum table may be used for controlling a position of the first layer web, e.g., of the first layer edge. Thus, as an example, the vacuum table may be configured for guiding the first layer web in a stable planar arrangement. The vacuum table may for example comprise diagonally standing wheels for guiding the first layer web, specifically the first layer edge, in a predefined position.

The method may further comprise detecting, by using at least one spacer layer sensor, the position of the spacer layer edge of the continuous spacer layer web fed into the first lamination station. The spacer layer sensor may comprise at least one infrared sensor. In particular, the spacer layer sensor may specifically comprise at least one infrared sensor having a sensing direction transverse to a plane of extension of the spacer layer web.

The method may further comprise detecting, by using at least one laminate sensor, the position of the first layer edge of a continuous intermediate laminate web generated in step ii. The term "intermediate laminate web" as used herein is a broad term and is to be given its ordinary and customary meaning to a person of ordinary skill in the art and is not to be limited to a special or customized meaning. The term specifically may refer, without limitation, to an at least partially processed web, such as to a web comprising united layers of materials. The laminate web may comprise the first layer web and the spacer layer web. Specifically, the intermediate laminate web may be or may comprise the first layer web united with the spacer layer web, e.g., united in the first lamination station. In particular, the laminate web, such as the intermediate laminate web, may be fed into the second lamination station.

The laminate sensor may comprise at least one infrared sensor, specifically at least one infrared sensor having a sensing direction transverse to a plane of extension of the laminate web.

Additionally or alternatively, a vacuum table may be used for controlling a position of the laminate web being fed into the second lamination station.

The method may further comprise detecting, by using at least one second layer sensor, the position of the second layer edge of the continuous second layer web being fed into the second lamination station.

The second layer sensor may specifically comprise at least one of an ultrasound sensor and an infrared sensor, specifically an ultrasound sensor and/or infrared sensor having a sensing direction transverse to a plane of extension of the second layer web. The term "ultrasound sensor" as used herein is a broad term and is to be given its ordinary and customary meaning to a person of ordinary skill in the art and is not to be limited to a special or customized meaning. The term specifically may refer, without limitation, to a sensor being configured for determining and/or measuring at least one position of at least one object and/or element by using ultrasound, such as sound emitted in an ultrasound frequency, e.g., sound having a frequency f with 20,000 Hz≤f≤200,000,000 Hz, specifically 30,000 Hz≤f≤100,000,000 Hz, more specifically 50,000 Hz≤f≤50,000,000 Hz. Thus, as an example, the ultrasound sensor may be configured for using sound having a frequency of f=150,000 Hz.

In a further aspect, a cutting station for cutting at least one raw layer web is disclosed. The method, according to the present disclosure, of producing a plurality of analytical test strips, such as according to any one of the embodiments described above and/or according to any one of the embodiments described in further detail below, may imply using the at least one cutting station. Further, the manufacturing system, according to the present disclosure, for producing a plurality of analytical test strips, such as according to any one of the embodiments described in further detail below, may also comprise the at least one cutting station. Still, the cutting station as proposed herein may also be used independently, without the further features of the method or manufacturing system according to the present disclosure.

The term "cutting" as used herein is a broad term and is to be given its ordinary and customary meaning to a person of ordinary skill in the art and is not to be limited to a special or customized meaning. The term specifically may refer, without limitation, to a process of separating at least one object and/or element, wherein a defined and/or controlled edge and/or cutting edge is generated. The cutting station comprises at least one cutting blade for cutting the raw layer web in a cutting angle α between a surface of the raw layer web and a surface of the cutting blade, wherein 20°≤α≤40°.

In particular, the cutting station may be configured for cutting the at least one raw layer web parallel to a longitudinal direction of extension of the raw layer web. The term "raw" as used herein is a broad term and is to be given its ordinary and customary meaning to a person of ordinary skill in the art and is not to be limited to a special or customized meaning. The term specifically may refer, without limitation, to a preprocessing state of an arbitrary material, such as to a unrefined and/or crude state. The raw layer web as used herein may specifically refer to a state of the layer web previous to cutting, such as to an uncut layer web.

Specifically, the cutting station may be configured for cutting the at least one raw layer web by using the at least one cutting blade. In particular, the cutting station may be configured for cutting the at least one raw layer web by using a cutting angle α of 25°≤α≤35°, specifically 27°≤α≤33°, more specifically 29°≤α≤31°. Typically, the cutting angle α=30°. In particular, the cutting angle α may for example equal 30° with a maximum tolerance of ±5°, specifically with a maximum tolerance of ±3°, more specifically with a maximum tolerance of ±1°.

The cutting angle α of α=30° may specifically allow for a precise cut of the edge of the layer web, while avoiding spallings and/or delaminations of the layer web edge.

The cutting station may specifically comprise at least one kiss-cut station. The term "kiss-cut station" as used herein is a broad term and is to be given its ordinary and customary meaning to a person of ordinary skill in the art and is not to be limited to a special or customized meaning. The term specifically may refer, without limitation, to a cutting station configured for cutting an arbitrary material up to a predefined depth. In particular, the kiss-cut station may be configured for kiss-cutting a layer web, e.g., the spacer layer web and may comprise a cutting blade configured for entering the surface of the spacer layer web up until a predefined depth is reached. Thus, for example, the kiss-cut station may be configured for cutting only a predefined depth of the layer web.

In particular, the kiss-cut station may be configured for gradually deepening the cut, for example, over a predefined length. Thus, the kiss-cut station may deepen the cut up to the predefined depth gradually while the web may pass through the kiss-cut station. Specifically, the layer web may perform a change of travelling direction of up to 180°, such as a wrap around the kiss-cut station, while gradually deepening the cut up to the predefined depth.

The method of producing a plurality of analytical test strips as described above or as will be described in further detail below, may specifically make use of the cutting station. In particular, in the method, at least one cutting station may be used for cutting at least one raw layer web, such as the raw first layer web and/or the raw second layer web and/or the raw spacer layer web. Thus, for possible definitions of terms, reference may be made to the description of the cutting station and the description of the method. Specifically, the definitions given with respect to the method or the cutting station may be referred to interchangeably.

In particular, the providing of the continuous first layer web in step i. of the method may comprise providing a continuous raw first layer web to at least one first cutting station. In the first cutting station, the continuous raw first layer web may be cut in a cutting direction parallel to a longitudinal direction of extension of the raw first layer web, whereby the first layer edge may be generated.

Specifically, the continuous raw first layer web, may be provided from a first layer supply wheel. The term "supply wheel" as used herein is a broad term and is to be given its ordinary and customary meaning to a person of ordinary skill in the art and is not to be limited to a special or customized meaning. The term specifically may refer, without limitation, to a spool and/or drum configured for providing an arbitrary material stored on the spool and/or drum. In particular, the material may be wound and/or placed on the supply wheel for the purpose of providing the material for further processing. In the present case, the continuous raw layer web may be reeled up on the supply wheel, such as on the spool and/or drum, and may be provided to the cutting station by a rotating movement of the supply wheel, thereby unwinding the continuous raw layer web. The supply wheel may also be referred to as a supply reel.

The method may further comprise providing a continuous raw second layer web to at least one second cutting station. In the second cutting station, the continuous raw second layer web may be cut in a cutting direction parallel to a longitudinal direction of extension of the raw second layer web, whereby the second layer edge may be generated. The continuous raw second layer web may be provided from a second layer supply wheel.

The method may further comprise providing at least one continuous raw spacer layer web to at least one spacer layer cutting station, such as to a cutting station configured for cutting the at least one raw spacer layer. In particular, the spacer layer cutting station may be configured for cutting the continuous raw spacer layer web into the continuous spacer layer web before feeding the continuous spacer layer web into the first lamination station.

The spacer layer cutting station may specifically comprise the at least one kiss-cut station as described above or as will be described in further detail below. In particular, the raw spacer layer may comprise more than one layer, such as more than the spacer layer. As an example, the raw spacer layer may additionally to the spacer layer comprise at least one adhesive layer, such as a layer having adhesive properties, e.g., a layer of glue or the like. Thus, the kiss-cut station may, be configured for cutting the raw spacer layer into the continuous spacer layer web by only cutting the at least one adhesive layer while leaving the spacer layer intact.

The first electrode of the analytical test strip may specifically form a working electrode. The second electrode of the analytical test strip may form one or both of a counter electrode and a reference electrode.

The first electrode layer may comprise at least one metal layer and at least one detection layer disposed onto the metal layer. In particular, the detection layer may comprise at least one chemical compound configured for detecting the at least one analyte. The term "chemical compound" as used herein is a broad term and is to be given its ordinary and customary meaning to a person of ordinary skill in the art and is not to be limited to a special or customized meaning. The term specifically may refer, without limitation, to a substance configured for performing a reaction process in the presence of at least one other material. The chemical compound may specifically be configured for performing a reaction process by changing at least one detectable property in presence of the analyte. Thus, the chemical compound may specifically be configured for changing the at least one detectable property in the presence of the analyte to be detected.

The detection layer may comprise at least one enzyme. The term "enzyme" as used herein is a broad term and is to be given its ordinary and customary meaning to a person of ordinary skill in the art and is not to be limited to a special or customized meaning. The term specifically may refer, without limitation, to a biological catalyst. The enzyme may be configured for increasing a reaction rate in the detection layer. Thus, the enzyme may be configured for specifically speeding up the reaction process, such as the reaction process of the chemical compound. The enzyme may be or may comprise an analyte specific protein, such as a protein allowing for an analyte specific detection reaction. In particular, the enzyme may be configured for acting upon a specific analyte and/or group of analytes only. Thus, the enzyme may configured for converting only specific analytes in the sample, e.g., glucose in a sample of blood.

The first layer web may specifically be provided to the first lamination station with the first side being oriented in an upward fashion. Thus, when being fed into the first lamination station, the first side of the first layer web may face upward, such as in a direction opposing a direction of gravitational force.

The continuous second layer web may be fed into the second lamination station with the first side facing downward. Thus, when being fed into the second lamination station, the first side of the second layer web may face downward, such as in the direction of gravitational force.

The continuous first layer web may specifically be fed into the first lamination station via a plurality of rollers, wherein the first side may face away from the rollers. Thus, the plurality of rollers may specifically be configured for guiding the first layer web to the first lamination station without touching the first side of the first layer web.

As an example, the rollers may comprise at least one vacuum roller. In particular, the vacuum roller may make use of a vacuum and/or suction force when feeding the first layer web into the first lamination station. Thus, in order to guide the first layer web at least one vacuum roller may be used.

The continuous second layer web may be fed into the second lamination station via a plurality of rollers, wherein the first side faces away from the rollers. Thus, the plurality of rollers may specifically be configured for guiding the second layer web to the second lamination station without touching the first sider of the second layer web. The rollers, specifically the plurality of rollers feeding the second layer web into the second lamination station, may comprise at least one vacuum roller. Thus, as an example, in order to guide the second layer web at least one vacuum roller may be used.

In step iii. of the method, as an example, a continuous analytical test strip web may be generated, wherein the method may further comprise feeding the continuous analytical test strip web into at least one test strip cutting station. In particular, in the test strip cutting station, individual analytical test strips may be cut from the continuous analytical test strip web.

The method may further comprise using at least one fault detection station. The term "fault detection station" as used herein is a broad term and is to be given its ordinary and customary meaning to a person of ordinary skill in the art and is not to be limited to a special or customized meaning. The term specifically may refer, without limitation, to a device configured for identifying defects and/or errors. Specifically, the fault detection station may be configured for detecting faults and/or defects in one or more of the first layer web, the second layer web, the spacer layer web, a continuous intermediate laminate web generated in step ii. and a continuous analytical test strip web generated in step iii.

Further, the fault detection station may comprise at least one marking device configured for marking web sections detected as faulty. Thus, e.g., in addition to identifying defects, the fault detection station may be configured for marking the identified defects, such as by marking the respective web sections comprising the fault and/or defect in one or more of the first layer web, the second layer web, the spacer layer web, a continuous intermediate laminate web generated in step ii. and a continuous analytical test strip web generated in step iii.

The fault detection station may comprise at least one image recognition device. Thus, as an example, at least one image recognition device may be used for detecting and/or identifying defects and/or faults in the fault detection station.

The method may further comprise at least one disposal station, wherein, in the disposal station, web sections marked as faulty are disposed of. The disposal station may, for example, be a part of the at least one test strip cutting station.

The method may further comprise at least one electrostatic discharge station. The term "electrostatic discharge station" as used herein is a broad term and is to be given its ordinary and customary meaning to a person of ordinary skill in the art and is not to be limited to a special or customized meaning. The term specifically may refer, without limitation to a system and/or unit configured for dissipating electrostatic charges. As an example, the electrostatic discharge station may be or may comprise at least one grounding rod.

The electrostatic discharge station may specifically be arranged upstream, such as before, the first lamination station. In particular, the electrostatic discharge station may be arranged such that the spacer layer may be electrically discharged before entering the first lamination station.

In particular, the layer webs, specifically the first layer web and the second layer web, may not be guided by touching a side of the layer webs, such as a front face and/or end face of the layer webs, in order to avoid damaging the detection layer, e.g., for preventing delaminations and spallings. Thus, the first layer web and the second layer web may only be mechanically guided by touching a backside of the layer webs, specifically touching a side of the layer webs opposing the first sides, such as opposite to the side on which the electrode layer may be arranged and/or present. In particular, at least one frameless roller with flying bearings may be used for guiding and/or adapting a position of the layer webs, e.g., the first layer web and/or the second layer web. Further, vacuum rollers, for example having a microporous surface and/or a perforated stainless steel surface with throttle nozzles underneath, may be used for guiding the layer webs, e.g., the first layer web, the spacer layer web and/or the second layer web. Furthermore, draw rollers, for example draw rollers with an adhesive coating, may be used for guiding the layer webs.

In particular, the present method may allow for meeting a manufacturing tolerance of 0±0.1 mm of the alignment of the first layer and the second layer of the produced analytical test strips. This manufacturing tolerance may specifically be reachable, because the alignment sensor, such as the laser sensor, may be arranged such that a sensing direction may be essentially parallel to a plane of extension of the first layer web, e.g., may be facing the first layer edge perpendicularly. Measuring values and positions detected by the alignment sensor may then directly be used for controlling and if necessary correcting the position of the spacer layer edge according to the first layer edge in a master slave fashion. As an example, the adaption of the position of the slave position, e.g., of the position of the spacer layer edge, via the roller may be or may comprise a precision of ≤0.2 µm and may thus, as an example, allow for a highly accurate and precise readjustment of the position.

Further, in the method, a continuous calibration may be carried out with a second difference measurement against a certain constant distance, e.g., in addition to the measured alignment values. Thus, each measured alignment value may permanently be subjected to credibility test.

In a further aspect a manufacturing system for producing a plurality of analytical test strips by using a reel-to-reel process, each analytical test strip comprising at least one first layer having at least one first electrode, at least one spacer layer and at least one second layer having at least one second electrode is disclosed. The manufacturing system comprises:

I. at least one supplying device for providing at least one continuous first layer web, the first layer web having disposed on a first side at least one first electrode layer, the first layer web having a first layer edge;

II. at least one first lamination station, the first lamination station being configured for continuously disposing at least one continuous spacer layer web onto the first side of the first layer web, wherein the spacer layer web has a spacer layer edge, wherein the disposing is position-controlled in a master-slave fashion by using a position of the first layer edge as a master position and a position of the spacer layer edge as a slave position, wherein the disposing takes place such that the spacer layer edge is offset from the first layer edge and that, thereby, a portion of the first side of the first layer and a portion of the first electrode layer remain uncovered by the spacer layer web; and III. at least one second lamination station, the second lamination station being configured for continuously disposing at least one continuous second layer web onto the spacer layer web, the second layer web having disposed on a first side at least one second electrode layer, wherein the disposing is performed such that the second electrode layer faces the first layer web, wherein the second layer web has a second layer edge, wherein the disposing takes place such that the second layer edge is aligned with the first layer edge, and wherein the disposing is position-controlled in a master-slave fashion by using a position of the second layer edge as a slave position.

The term "supplying device" as used herein is a broad term and is to be given its ordinary and customary meaning to a person of ordinary skill in the art and is not to be limited to a special or customized meaning. The term specifically may refer, without limitation, to an arbitrary formed reservoir of material configured for providing and/or making available the at least one material.

The manufacturing system may specifically be configured for performing the method of producing a plurality of analytical test strips as described above or as described in further detail below. Thus, for possible additional definitions and embodiments reference may be made to the description given above or as described in further detail below.

The manufacturing system may further comprise at least one control device configured for controlling at least one of the first lamination station and the second lamination station. The term "control device" as used herein is a broad term and is to be given its ordinary and customary meaning to a person of ordinary skill in the art and is not to be limited to a special or customized meaning. The term specifically may refer, without limitation, to a system for monitoring and/or regulating purposes. In particular, the control device may be configured for monitoring and/or regulating at least one property of the first lamination station and/or of the second lamination station.

The supplying device for providing the continuous first layer web may specifically comprise at least one supply reel, e.g., at least one supply wheel.

The manufacturing system may further comprise at least one supplying device for providing the continuous spacer layer web, specifically at least one supply reel, such as at least one supply wheel.

The manufacturing system may further comprise at least one supplying device for providing the continuous second layer web, specifically at least one supply reel, such as at least one supply wheel.

Further, the manufacturing system may comprise at least one storage device for intermediately storing a continuous analytical test strip web generated by the second lamination station.

The manufacturing system may specifically further comprise at least one cutting station as described above or as will be described in further detail below.

The manufacturing system according to the present disclosure and/or the method according to the present disclosure may fully or partially be computer-controlled. Thus, the manufacturing system may comprise at least one controller, such as at least one processor, for controlling the manufacturing system and/or method.

The methods, stations and systems according to the present disclosure may provide a large number of advantages over known methods, stations and systems. In particular, the disclosed manufacturing system and method of producing a plurality of analytical test strips may reduce a quantity of production rejects compared to known systems and methods. Specifically, an occurrence of scratches and contaminations may be reduced. Further, in the proposed systems and methods, material damages such as spallings and delaminations caused by state-of-the-art guiding systems may be significantly reduced or even eliminated. Thus, in particular, discard rated due to material related safety issues may be minimized and manufacturing yield may be increased.

Further, the methods, stations and systems may allow for a more precise and accurate manufacturing of the analytical test strips. Thus, the production process may be improved and may specifically be more economic due to decreasing discard rates and more efficient use of resources.

Summarizing and without excluding further possible embodiments, the following embodiments may be envisaged:

Embodiment 1: A method of producing a plurality of analytical test strips by using a reel-to-reel process, each analytical test strip comprising at least one first layer having at least one first electrode, at least one spacer layer and at least one second layer having at least one second electrode, the method comprising:
  i. providing at least one continuous first layer web having disposed on a first side at least one first electrode layer, the first layer web having a first layer edge;
  ii. continuously disposing, in at least one first lamination station, at least one continuous spacer layer web onto the first side of the first layer web, wherein the spacer layer web has a spacer layer edge, wherein the disposing is position-controlled in a master-slave fashion by using a position of the first layer edge as a master position and a position of the spacer layer edge as a slave position, wherein the disposing takes place such that the spacer layer edge is offset from the first layer edge and that, thereby, a portion of the first side of the first layer and a portion of the first electrode layer remain uncovered by the spacer layer web; and
  iii. continuously disposing, in at least one second lamination station, at least one continuous second layer web onto the spacer layer web, the second layer web having disposed on a first side at least one second electrode layer, wherein the disposing is performed such that the second electrode layer faces the first layer web, wherein the second layer web has a second layer edge, wherein the disposing takes place such that the second layer edge is aligned with the first layer edge, and wherein the disposing is position-controlled in a master-slave fashion by using a position of the second layer edge as a slave position.

Embodiment 2: The method according to the preceding embodiment, wherein step iii. is performed such that the position of the first layer edge is used as a master position.

Embodiment 3: The method according to any one of the preceding embodiments, further comprising detecting, by using at least one alignment sensor downstream the second lamination station, an alignment between the second layer edge and the first layer edge and controlling a position of the second layer edge of the continuous second layer web being fed into the second lamination station.

Embodiment 4: The method according to the preceding embodiment, wherein the alignment sensor comprises at least one optical distance sensor having a sensing direction essentially parallel to a plane of extension of the first layer web, specifically having a sensing direction onto and/or perpendicular to the first layer edge and the second layer edge and typically also the spacer layer edge.

Embodiment 5: The method according to any one of the two preceding embodiments, wherein the alignment sensor comprises at least one laser sensor, specifically a laser profile sensor.

Embodiment 6: The method according to any one of the three preceding embodiments, wherein the alignment sensor is configured for simultaneously detecting a position of the first layer edge, the spacer layer edge and the second layer edge.

Embodiment 7: The method according to any one of the four preceding embodiments, wherein deviations in alignment between the first layer edge and the second layer edge are at least partially corrected by correcting the position of the second layer edge of the continuous second layer web being fed into the second lamination station.

Embodiment 8: The method according to the preceding embodiment, wherein the correcting of the position of the second layer edge is performed automatically.

Embodiment 9: The method according to any one of the two preceding embodiments, wherein the correcting of the position of the second layer edge comprises tilting at least one roller over which the continuous second layer web is fed into the second lamination station.

Embodiment 10: The method according to any one of the preceding embodiments, wherein the position-controlled disposing in steps ii. and iii. is a position-controlled disposing with respect to a position perpendicular to a direction of transport direction of the webs.

Embodiment 11: The method according to any one of the preceding embodiments, further comprising detecting, by using at least one offset sensor downstream the first lamination station, an offset between the spacer layer edge and the first layer edge and controlling a position of the spacer layer edge of the continuous spacer layer web being fed into the first lamination station.

Embodiment 12: The method according to the preceding embodiment, wherein the offset sensor comprises at least one image recognition device configured for continuous image recognition of a camera image in a direction of view transverse to the plane of extension of the first layer web.

Embodiment 13: The method according to any one of the two preceding embodiments, wherein the offset is compared with at least one nominal offset, and wherein deviations between the offset and the nominal offset are at least partially corrected by correcting the position of the spacer layer edge of the continuous spacer layer web being fed into the first lamination station.

Embodiment 14: The method according to the preceding embodiment, wherein the correcting the position of the spacer layer edge comprises tilting at least one roller over which the spacer layer web is fed into the first lamination station.

Embodiment 15: The method according to any one of the preceding embodiments, further comprising detecting, by using at least one first layer sensor, the position of the first layer edge of the continuous first layer web being fed into the first lamination station.

Embodiment 16: The method according to the preceding embodiment, wherein the first layer sensor comprises at least one infrared sensor, specifically at least one infrared sensor having a sensing direction transverse to a plane of extension of the first layer web.

Embodiment 17: The method according to any one of the preceding embodiments, further comprising detecting, by using at least one spacer layer sensor, the position of the spacer layer edge of the continuous spacer layer web fed into the first lamination station.

Embodiment 18: The method according to the preceding embodiment, wherein the spacer layer sensor comprises at least one infrared sensor, specifically at least one infrared sensor having a sensing direction transverse to a plane of extension of the spacer layer web.

Embodiment 19: The method according to any one of the preceding embodiments, further comprising detecting, by using at least one laminate sensor, the position of the first layer edge of a continuous intermediate laminate web generated in step ii., the laminate web comprising the first layer web and the spacer layer web, the laminate web being fed into the second lamination station.

Embodiment 20: The method according to the preceding embodiment, wherein the laminate sensor comprises at least one infrared sensor, specifically at least one infrared sensor having a sensing direction transverse to a plane of extension of the laminate web.

Embodiment 21: The method according to any one of the preceding embodiments, further comprising detecting, by using at least one second layer sensor, the position of the second layer edge of the continuous second layer web being fed into the second lamination station.

Embodiment 22: The method according to the preceding embodiment, wherein the second layer sensor comprises at least one of an ultrasound sensor and an infrared sensor, specifically an ultrasound sensor and/or infrared sensor having a sensing direction transverse to a plane of extension of the second layer web.

Embodiment 23: A cutting station configured for cutting at least one raw layer web, the cutting station comprising at least one cutting blade for cutting the at least one raw layer web in a cutting angle α between a surface of the raw layer web and a surface of the cutting blade, wherein $20° \leq \alpha \leq 40°$.

Embodiment 24: The cutting station according to the preceding embodiment, wherein the cutting station is configured for cutting the at least one raw layer web parallel to a longitudinal direction of extension of the raw layer web.

Embodiment 25: The cutting station according to any one of the two preceding embodiments, wherein the cutting angle α is $25° \leq \alpha \leq 35°$, specifically $27° \leq \alpha \leq 33°$, more specifically $29° \leq \alpha \leq 31°$, typically $\alpha = 30°$.

Embodiment 26: The method according to any one of the preceding embodiments referring to a method, wherein the method comprises using at least one cutting station according to any one of the preceding embodiments referring to a cutting station.

Embodiment 27: The method according to the preceding embodiment, the cutting station comprises at least one first cutting station, wherein the providing of the continuous first layer web in step i. comprises providing a continuous raw first layer web to the at least one first cutting station, wherein, in the first cutting station, the continuous raw first layer web is cut in a cutting direction parallel to a longitudinal direction of extension of the raw first layer web, whereby the first layer edge is generated.

Embodiment 28: The method according to the preceding embodiment, wherein the continuous raw first layer web is provided from a first layer supply wheel.

Embodiment 29: The method according to any one of the three preceding embodiments, wherein the cutting station comprises at least one second cutting station, wherein the method further comprises providing a continuous raw second layer web to the at least one second cutting station, wherein, in the second cutting station, the continuous raw second layer web is cut in a cutting direction parallel to a longitudinal direction of extension of the raw second layer web, whereby the second layer edge is generated.

Embodiment 30: The method according to the preceding embodiment, wherein the continuous raw second layer web is provided from a second layer supply wheel.

Embodiment 31: The method according to any one of the five preceding embodiments, wherein the cutting station comprises at least one spacer layer cutting station, wherein the method further comprises providing at least one continuous raw spacer layer web to the at least one spacer layer cutting station, wherein the spacer layer cutting station cuts the continuous raw spacer layer web into the continuous spacer layer web before feeding the continuous spacer layer web into the first lamination station.

Embodiment 32: The method according to the preceding embodiment, wherein the spacer layer cutting station comprises at least one kiss-cut station.

Embodiment 33: The method according to any one of the preceding embodiments, wherein the first electrode of the analytical test strips forms a working electrode and wherein the second electrode of the analytical test strips forms one or both of a counter electrode and a reference electrode.

Embodiment 34: The method according to any one of the preceding embodiments, wherein the first electrode layer comprises at least one metal layer and at least one detection layer disposed onto the metal layer, the detection layer comprising at least one chemical compound configured for detecting at least one analyte.

Embodiment 35: The method according to the preceding embodiment, wherein the detection layer comprises at least one enzyme.

Embodiment 36: The method according to any one of the preceding embodiments, wherein the first layer web is provided to the first lamination station with the first side being oriented in an upward fashion.

Embodiment 37: The method according to any one of the preceding embodiments, wherein the continuous second layer web is fed into the second lamination station with the first side facing downward.

Embodiment 38: The method according to any one of the preceding embodiments, wherein the continuous first layer web is fed into the first lamination station via a plurality of rollers, wherein the first side faces away from the rollers.

Embodiment 39: The method according to the preceding embodiment, wherein the rollers comprise at least one vacuum roller.

Embodiment 40: The method according to any one of the preceding embodiments, wherein the continuous second layer web is fed into the second lamination station via a plurality of rollers, wherein the first side faces away from the rollers.

Embodiment 41: The method according to the preceding embodiment, wherein the rollers comprise at least one vacuum roller.

Embodiment 42: The method according to any one of the preceding embodiments, wherein, in step iii., a continuous analytical test strip web is generated, wherein the method further comprises feeding the continuous analytical test strip web into at least one test strip cutting station, wherein, in the test strip cutting station, individual analytical test strips are cut from the continuous analytical test strip web.

Embodiment 43: The method according to any one of the preceding embodiments, wherein the method further comprises using at least one fault detection station, wherein, in the fault detection station, faults in one or more of the first layer web, the second layer web, the spacer layer web, a continuous intermediate laminate web generated in step ii., or a continuous analytical test strip web generated in step iii. are detected, wherein the fault detection station further comprises marking devices for marking web sections detected as faulty.

Embodiment 44: The method according to the preceding embodiment, wherein the method further comprises at least one disposal station, wherein, in the disposal station, web sections marked as faulty are disposed of.

Embodiment 45: The method according to the preceding embodiment, wherein the disposal station is part of a test strip cutting station.

Embodiment 46: The method according to any one of the three preceding embodiments, wherein the fault detection station comprises at least one image recognition device.

Embodiment 47: The method according to any one of the preceding method embodiments, wherein the method further comprises at least one electrostatic discharge station, wherein in the electrostatic discharge station is configured for preventing electrostatic charging of the analytical test strips.

Embodiment 48: The method according to the preceding embodiment, wherein the at least one electrostatic discharge station is arranged upstream of the first lamination station.

Embodiment 49: A manufacturing system for producing a plurality of analytical test strips by using a reel-to-reel process, each analytical test strip comprising at least one first layer having at least one first electrode, at least one spacer layer and at least one second layer having at least one second electrode, the manufacturing system comprising:
- I. at least one supplying device for providing at least one continuous first layer web, the first layer web having disposed on a first side at least one first electrode layer, the first layer web having a first layer edge;
- II. at least one first lamination station, the first lamination station being configured for continuously disposing at least one continuous spacer layer web onto the first side of the first layer web, wherein the spacer layer web has a spacer layer edge, wherein the disposing is position-controlled in a master-slave fashion by using a position of the first layer edge as a master position and a position of the spacer layer edge as a slave position, wherein the disposing takes place such that the spacer layer edge is offset from the first layer edge and that, thereby, a portion of the first side of the first layer and a portion of the first electrode layer remain uncovered by the spacer layer web; and
- III. at least one second lamination station, the second lamination station being configured for continuously disposing at least one continuous second layer web onto the spacer layer web, the second layer web having disposed on a first side at least one second electrode layer, wherein the disposing is performed such that the second electrode layer faces the first layer web, wherein the second layer web has a second layer edge, wherein the disposing takes place such that the second layer edge is aligned with the first layer edge, and wherein the disposing is position-controlled in a master-slave fashion by using a position of the second layer edge as a slave position.

Embodiment 50: The manufacturing system according to the preceding system embodiment, wherein the manufacturing system is configured for performing the method according to any one of the preceding embodiments referring to a method.

Embodiment 51: The manufacturing system according to any one of the preceding system embodiments, the manufacturing system further comprising at least one control device configured for controlling at least one of the first lamination station and the second lamination station.

Embodiment 52: The manufacturing system according to any one of the preceding system embodiments, wherein the supplying device for providing the continuous first layer web comprises at least one supply reel.

Embodiment 53: The manufacturing system according to any one of the preceding system embodiments, further comprising at least one supplying device for providing the continuous spacer layer web, specifically at least one supply reel.

Embodiment 54: The manufacturing system according to any one of the preceding system embodiments, further comprising at least one supplying device for providing the continuous second layer web, specifically at least one supply reel.

Embodiment 55: The manufacturing system according to any one of the preceding system embodiments, further comprising at least one storage device for intermediately storing a continuous analytical test strip web generated by the second lamination station.

Embodiment 56: The manufacturing system according to any one of the preceding system embodiments, wherein the manufacturing system further comprises at least one cutting station according to any one of the preceding embodiments referring to a cutting station.

Embodiment 57: The manufacturing system according to any one of the preceding system embodiments, wherein the manufacturing system further comprises at least one fault detection station, wherein the fault detection station further comprises marking devices for marking web sections detected as faulty.

Embodiment 58: The manufacturing system according to the preceding embodiment, wherein the manufacturing system further comprises at least one disposal station, wherein, in the disposal station, web sections marked as faulty are disposed of.

Embodiment 59: The manufacturing system according to the preceding embodiment, wherein the disposal station is part of a test strip cutting station.

Embodiment 60: The manufacturing system according to any one of the three preceding embodiments, wherein the fault detection station comprises at least one image recognition device.

Embodiment 61: The manufacturing system according to any one of the preceding system embodiments, wherein the manufacturing system further comprises at least one electrostatic discharge station, wherein in the electrostatic discharge station is configured for preventing electrostatic charging of the analytical test strips.

Embodiment 62: The manufacturing system according to the preceding embodiment, wherein the at least one electrostatic discharge station is arranged upstream of the first lamination station.

In order that the embodiments of the present disclosure may be more readily understood, reference is made to the following examples, which are intended to illustrate the disclosure, but not limit the scope thereof.

In FIG. 1 a schematic illustration of an embodiment of a manufacturing system 110 is shown. The manufacturing system 110 comprises at least one supplying device 112 for providing at least one continuous first layer web 114, specifically to a first lamination station 116. The first layer web 114 has disposed on a first side 118 at least one first electrode layer 120. The first layer web 114 further has at least one first layer edge 122.

The manufacturing system 110 further comprises the at least one first lamination station 116 being configured for continuously disposing at least one continuous spacer layer web 124 onto the first side 118 of the first layer web 114. The spacer layer web 124 has a spacer layer edge 126 and may be adhesive on both sides. The disposing is position-controlled in a master-slave fashion by using a position of the first layer edge 122 as a master position and a position of the spacer layer edge 126 as a slave position. The disposing takes place such that the spacer layer edge 126 is offset from the first layer edge 122 and that, thereby a portion of the first side 118 of the first layer 114 and a portion of the first electrode layer 120 remain uncovered by the spacer layer web 124. As an example, in FIG. 3 the uncovered portion is referenced with letter "A".

Further, the manufacturing system 110 comprises at least one second lamination station 128 being configured for continuously disposing at least one continuous second layer web 130 onto the spacer layer web 124. The second layer web 130 has disposed on a first side 132 at least one second electrode layer 134. The disposing is performed such that the second electrode layer 134 faces the first layer web 114. The second layer web 130 has a second layer edge 136. The disposing takes place such that the second layer edge 136 is aligned with the first layer edge 122, and the disposing is position-controlled in a master-slave fashion by using a position of the second layer edge 136 as a slave position.

The manufacturing system 110 may further comprise at least one control device 138 configured for controlling at least one of the first lamination station 116 and the second lamination station 128. Further, the manufacturing system 110 may comprise at least one supplying device 112 for providing the continuous spacer layer web 124 and at least one supplying device 112 for providing the continuous second layer web 130. Each supplying device 112 may specifically comprise at least one supply reel 140. The manufacturing system 110 further may comprise at least one storage device 142 for intermediately storing a continuous analytical test strip web 144 generated by the second lamination station 128. Further, the manufacturing system 110 may comprise at least one splicing station 145, wherein the splicing station 145 may be used for appending and/or extending the layer webs. Thus, as an example, the manufacturing system 110 may specifically comprise three splicing stations 145 for the purpose of appending and/or extending the first layer web 114, the spacer layer web 124 and the second layer web 130 into the continuous first layer web 114, the continuous spacer layer web 124 and the continuous second layer web 130 respectively.

Figure 4:
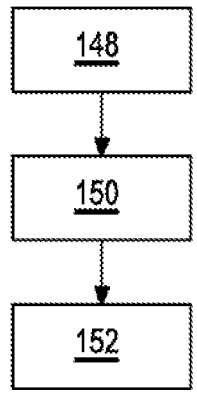
FIGS. 4 and 5 show flow charts of embodiments of a method of producing a plurality of analytical test strips.
Figure 5:
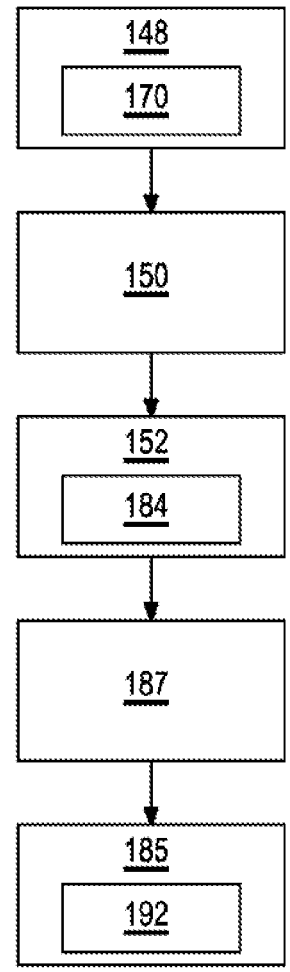

The manufacturing system 110 may specifically be configured for performing a method of producing a plurality of analytical test strips 146 by using a reel-to-reel process. Thus, the manufacturing system 110 may comprise further elements, such as further elements for performing the method. Exemplary embodiments of the method are illustrated in any one of FIGS. 4, 5 and 6.

The method of producing a plurality of analytical test strips 146 by using a reel-to-reel process comprises at least the following steps:

i. (denoted with reference number 148) providing at least one continuous first layer web 114, having disposed on a first side 118 at least one first electrode layer 120, the first layer web 114 having a first layer edge 122;

ii. (denoted with reference number 150) continuously disposing, in at least one first lamination station 116, at least one continuous spacer layer web 124 onto the first side 118 of the first layer web 114, wherein the spacer layer web 114 has a spacer layer edge 126, wherein the disposing is position-controlled in a master-slave fashion by using a position of the first layer edge 122 as a master position and a position of the spacer layer edge 126 as a slave position, wherein the disposing takes place such that the spacer layer edge 126 is offset from the first layer edge 122 and that, thereby, a portion of the first side 118 of the first layer 114 and a portion of the first electrode layer 120 remain uncovered by the spacer layer web 124; and iii. (denoted with reference number 152) continuously disposing, in at least one second lamination station 128, at least one continuous second layer web 130 onto the spacer layer web 124, the second layer web 130 having disposed on a first side 132 at least one second electrode layer 134, wherein the disposing is performed such that the second electrode layer 134 faces the first layer web 114, wherein the second layer web 130 has a second layer edge 136, wherein the disposing takes place such that the second layer edge 136 is aligned with the first layer edge 122, and wherein the disposing is position-controlled in a master-slave fashion by using a position of the second layer edge 136 as a slave position.

In particular, the method may further comprise detecting, by using at least one alignment sensor 154, e.g., further comprised by the manufacturing system 110, downstream the second lamination station 128, an alignment between the second layer edge 136 and the first layer edge 122. The alignment sensor 154 may specifically be or may comprise at least one laser sensor, such as a laser profile sensor. Further, the alignment sensor 154 may be configured for simultaneously detecting a position of the first layer edge 122, the spacer layer edge 126 and the second layer edge 136. In case deviations in alignment between the first layer edge and the second layer edge are detected, as an example, the deviations may at least partially be corrected by correcting the position of the second layer edge 136 of the continuous second layer web 130. The correcting of the position of the second layer edge 136 may specifically comprise tilting at least one roller 156, e.g., further comprised by the manufacturing system 110, over which the continuous second layer web 130 may be fed into the second lamination station 128.

As an example, the method may further comprise detecting, by using at least one offset sensor 158, e.g., further comprised by the manufacturing system 110, downstream the first lamination station 116, an offset between the spacer layer edge 126 and the first layer edge 122. The offset sensor 158 may specifically comprises at least one image recognition device configured for continuous image recognition of a camera image in a direction of view transverse to a plane of extension of the first layer web 114. The offset, specifically the offset detected by using the offset sensor 158, may for example be compared with at least one nominal offset and a deviation between the offset and the nominal offset may at least partially be corrected by correcting a position of the spacer layer edge 126 of the continuous spacer layer web 124. The correcting of the position of the spacer layer edge 126 may specifically comprise tilting at least one roller 160, e.g., further comprised by the manufacturing system 110, over which thee spacer layer web 124 may be fed into the first lamination station 116.

The method may further comprise detecting, by using at least one first layer sensor 162, e.g., further comprised by the manufacturing system 110, a position of the first layer edge 122 of the continuous first layer web 114 being fed into the first lamination station 116. The first layer sensor 162 may specifically comprise at least one infrared sensor, such as an infrared sensor having a sensing direction transverse to a plane of extension of the first layer web 114. Further sensors may be used in the method, such as at least one spacer layer sensor 164 for detecting a position of the spacer layer edge 126, a laminate sensor 165 for detecting a position of the first layer edge 122 of a continuous intermediate laminate web 166 generated in step ii. 150 of the method. The laminate web 166 may specifically comprise the first layer web 114 and the spacer layer web 124. Further, the method may comprise detecting, by using at least one second layer sensor 168, the position of the second layer edge 136 of the continuous second layer web 130 position. The second layer sensor 168 may specifically comprise at least one of an ultrasound sensor and an infrared sensor, specifically an ultrasound sensor and/or infrared sensor having a sensing direction transverse to a plane of extension of the second layer web 130. As an example, the further sensors, such as the first layer sensor 162, the spacer layer sensor 164, the laminate sensor 165 and the second layer sensor 168, may also be comprised by the manufacturing system 110. The further sensors, e.g., the first layer sensor 162, the spacer layer sensor 164, the laminate sensor 165 and the second layer sensor 168, may specifically be arranged such as to have a sensing direction facing a back of the layer webs, e.g., in order to avoid an influence on the measurement result caused by reflections, e.g., reflections of light.

The method, specifically step i. of the method, may further comprise a substep (denoted with reference number 170) of providing a continuous raw first layer web 114, such as a raw first layer web 114, to at least one cutting station 172, such as to a first cutting station 174. In the first cutting station 174, the continuous raw first layer web 114 may be cut in a cutting direction parallel to a longitudinal direction of extension of the raw first layer web 114, such as in a direction of travel of the first layer web 114, whereby the first layer edge 122 may be generated. In particular, arrows shown in FIG. 1, may indicate a direction of travel of the respective layer web. Further, the method may comprise providing a continuous raw second layer web 130 to at least one second cutting station 176, wherein, in the second cutting station 176, the continuous raw second layer web 130 may be cut in a cutting direction parallel to a longitudinal direction of extension of the raw second layer web 130, whereby the second layer edge 136 may be generated. Furthermore, the method may comprise providing at least one continuous raw spacer layer web 124 to at least one spacer layer cutting station 178, wherein the spacer layer cutting station 178 may cut the continuous raw spacer layer web into the continuous spacer layer web 124 before feeding the continuous spacer layer web 124 into the first lamination station 116. Specifically, the spacer layer cutting station 178 may be or may comprise at least one kiss-cut station.

Figure 2:
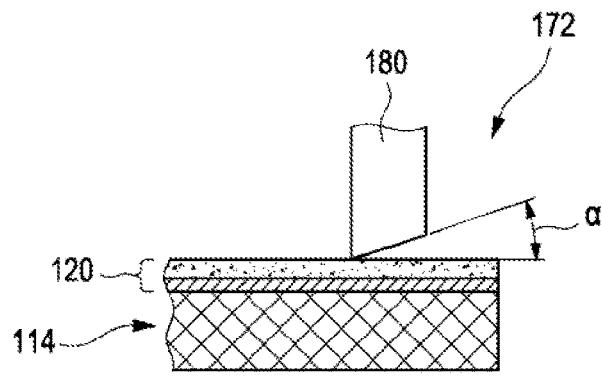
FIGS. 2a and 2b show embodiments of a cutting station.
Figure 2:
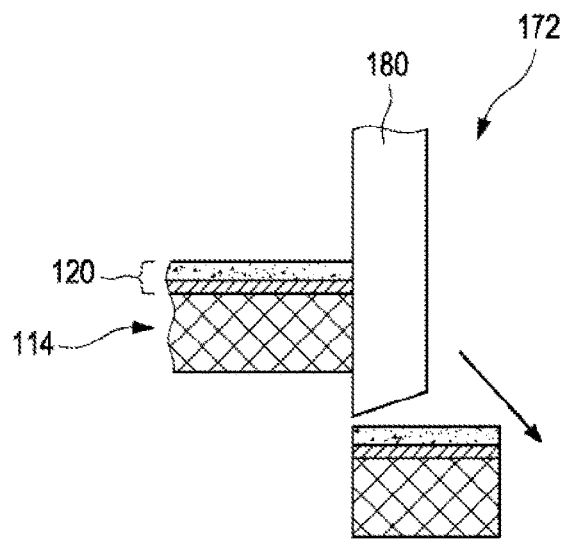

As an example, the cutting station 172, specifically the first cutting station 174, the second cutting station 176 and the spacer layer cutting station 178, may be comprised by the manufacturing system 110. An embodiment of the cutting station 172 is illustrated in FIGS. 2 a and 2 b, wherein exemplarily the cutting of the first layer web 114, specifically of the first layer web with the first electrode layer 120, is illustrated. Specifically, FIG. 2 a shows the cutting station before cutting and FIG. 2 b shows the cutting station during performing the cutting. The cutting station 172 comprises at least one cutting blade 180 for cutting at least one raw layer web, such as one or more of the raw first layer web 114, the raw second layer web 130 and the raw spacer layer web 124, in a cutting angle α between a surface of the raw layer web and a surface of the cutting blade 180. The cutting angle α may specifically be α=30°.

The manufacturing system 110 may further comprise a plurality of rollers 182. In particular, each of the continuous first layer web 114 and the continuous second layer web 130 may be fed via the plurality of rollers 182 into the first lamination station 116 and into the second lamination station 128, respectively. Specifically, the method may comprise feeding the first layer web 114 into the first lamination station 116 and the second layer web 130 into the second lamination station 128 with the first sides 118 and 132 facing away from the rollers 182. As an example, the first layer web 114 may be provided to the first lamination station 116 with the first side 118 being oriented in an upward fashion and the second layer web 130 may be fed into the second lamination station 128 with the first side 132 facing downward.

The method, specifically step iii. of the method, may further comprise a substep (denoted with reference number 184) of generating the continuous analytical test strip web 144. As an example, the generated analytical test strip web 144 may then be fed into at least one test strip cutting station, wherein analytical test strips 146 may be cut from the continuous analytical test strip web 144. Thus, the method may further comprise a substep (denoted with reference number 185) of cutting the analytical test strips 146 from the continuous analytical test strip web 144.

The method may further comprise using a printing station 186, e.g., further comprised by the manufacturing system 110, for printing information onto the analytical test strip web 144. Further, the method may comprise a substep (denoted with reference number 187) of using at least one fault detection station 188, e.g., further comprised by the manufacturing system 110. The fault detection station 188 may specifically be configured for detecting faults in one or more of the first layer web 114, the second layer web 130, the spacer layer web 124, the continuous intermediate laminate web 166 as generated in step ii. and the continuous analytical test strip web 144 as generated in step iii. In particular, the fault detection station 188 may further be configured for marking web sections detected as faulty, for example by using at least one laser 190 for marking the sections. Subsequently, specifically as part of the test strip cutting station, at least one disposal station may be used for performing a substep (denoted with reference number 192) of disposing web sections marked as faulty.

The method may further comprise at least one electrostatic discharge station 194, e.g., further comprised by the manufacturing system 110. The electrostatic discharge station 194 may specifically be configured for preventing electrostatic charging of the analytical test strips 146. Typically, the electrostatic discharge station 194 may be arranged upstream of the first lamination station 116. However, as illustrated in FIG. 1, further electrostatic discharge stations 194 may be arranged within the manufacturing system 110, such as for example, with each liner residue roll 196 on which peeled off residues of the spacer layer web 124, such as peeled off protective liners, may be stored, and/or within one or both of the printing station 186 and the fault detection station 188 and/or before storing the analytical test strip web 144 on the storage device 142. Further locations for arranging the at least one electrostatic discharge station 194 may be feasible.

Figure 3:
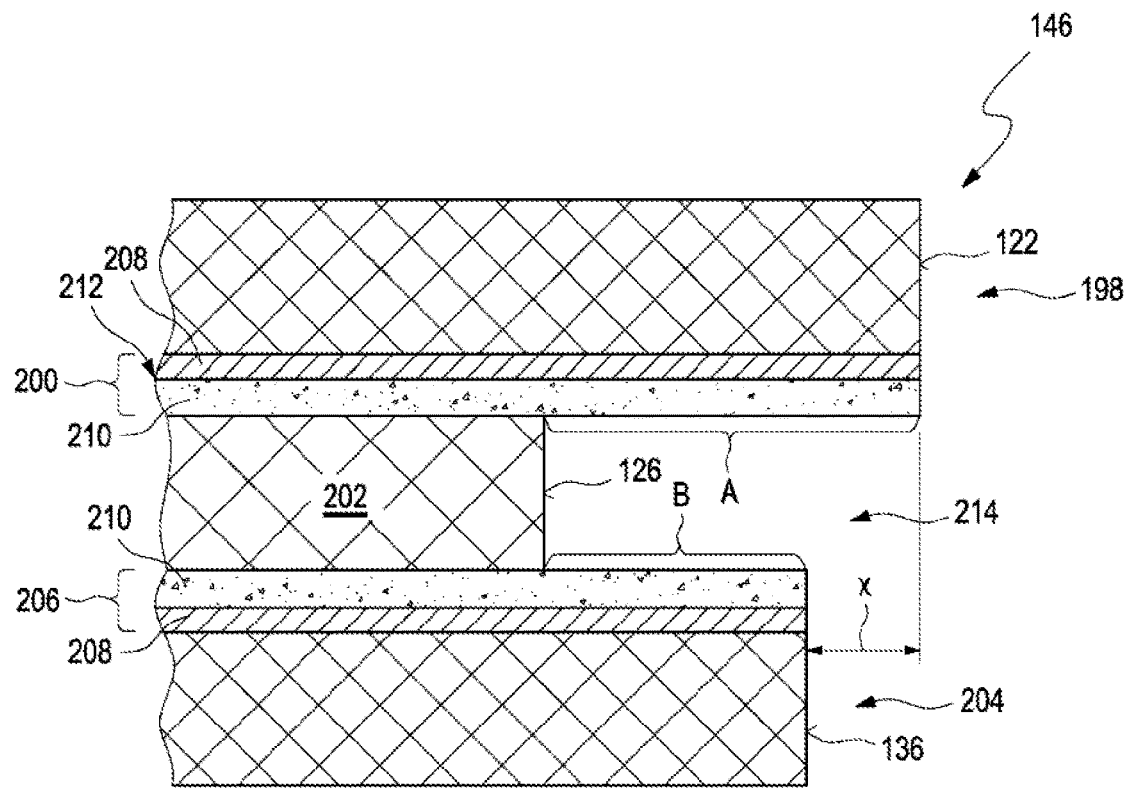
FIG. 3 shows a section view of an embodiment of a manufactured analytical test strip.

In FIG. 3, a section view of an embodiment of a manufactured analytical test strip 146 is illustrated. The analytical test strip 146 comprises at least one first layer 198, such as a part of the first layer web 114, having at least one first electrode 200, e.g., a part of the first electrode layer 120. Further, the analytical test strip 146 comprises at least one spacer layer 202, such as a part of the spacer layer web 124, and a second layer 204, e.g., a part of the second layer web 130, having at least one second electrode 206, e.g., a part of the second electrode layer 134. In particular, the first electrode 200, such as a part of the first electrode layer 120, may form a working electrode and the second electrode 206, e.g., a part of the second electrode layer 134, may form one or both of a counter electrode and a reference electrode. The first electrode 200, as an example, may comprise at least one metal layer 208 and at least one detection layer 210 disposed onto the metal layer 208. The detection layer 210 of the first electrode 200 may for example comprise at least one enzyme 212. Further, the second electrode 206 may also comprise the at least one metal layer 208 and the at least one detection layer 210 disposed onto the metal layer 208. However, the enzyme may only be present in the detection layer 210 of the first electrode 200.

In the manufacturing system 110, specifically by performing the method of producing a plurality of analytical test strips 146 by using a reel-to-reel process, the first layer 198 and the spacer layer 202 may be positioned relative to each other such that a portion "A" of the first electrode 200 remains uncovered by the spacer layer 202. Additionally, in the manufacturing system 110, specifically by performing the method of producing a plurality of analytical test strips 146 by using a reel-to-reel process, the second layer 204 and the spacer layer 202 may be positioned relative to each other such that a portion "B" of the second electrode 206 remains uncovered by the spacer layer 202. A gap formed by the spacer layer between portions "A" and "B" may form a sample application zone 214 where a sample may be applied when using the analytical test strip 146 for analyte detection. In particular, the spacer layer may insulate, e.g., electrically insulate, the first electrode 200 and the second electrode 206 from each other.

Further, in the manufacturing system 110, specifically by performing step iii. of the method of producing a plurality of analytical test strips 146 by using a reel-to-reel process, the second layer edge 136, e.g., of the second layer 204, is aligned with the first layer edge 122, e.g., of the first layer 198, in a master-slave fashion. As an example, the alignment may be or may comprise a maximum difference "x" of ±0.1 mm.

As an example, the analytical test strip 146 may comprise two layer webs with electrode layers. These layer webs may specifically be made of or may at least partially comprise a web of polyethylene terephthalate (PET-web), specifically the webs may have gold sputtering on at least one side. One layer web, such as the first layer web 114, may for example have a plurality of punching outs, such as rectangular punchings. In particular, the first layer web 114 may be arranged such that the first electrode layer 120 may be arranged face to face with the second electrode layer 134 of the second layer web 130. Between the two layer webs, such as between the first layer web 114 and the second layer web 130, at least one spacer layer web 124 may be arranged. The spacer layer web 124 may specifically be adhesive on both sides and may be configured for insulating the electrode layers 120 and 134 against each other. The electrode layers 120 and 134 may, for example, protrude slightly beyond the spacer layer web 124 and may thereby form a transverse capillary, e.g., at at least one end of the analytical test strip 146. This transverse capillary may serve as a sample application zone 214. Thus, the analytical test strip 146 may allow for an easy sample application. Specifically, the electrode layers 120 and 134 may end aligned and may form a measuring cell. In particular, the electrode layer 120 and 134 may both be coated, such as comprising a detection layer 210, wherein the working electrode may comprise an enzyme-containing reagent and the counter electrode and/or a reference electrode may comprise an enzyme-free reagent.

Thus, as an example, the sample application zone 214 may further be or serve as a reaction zone for detecting the analyte.

Figure 6:
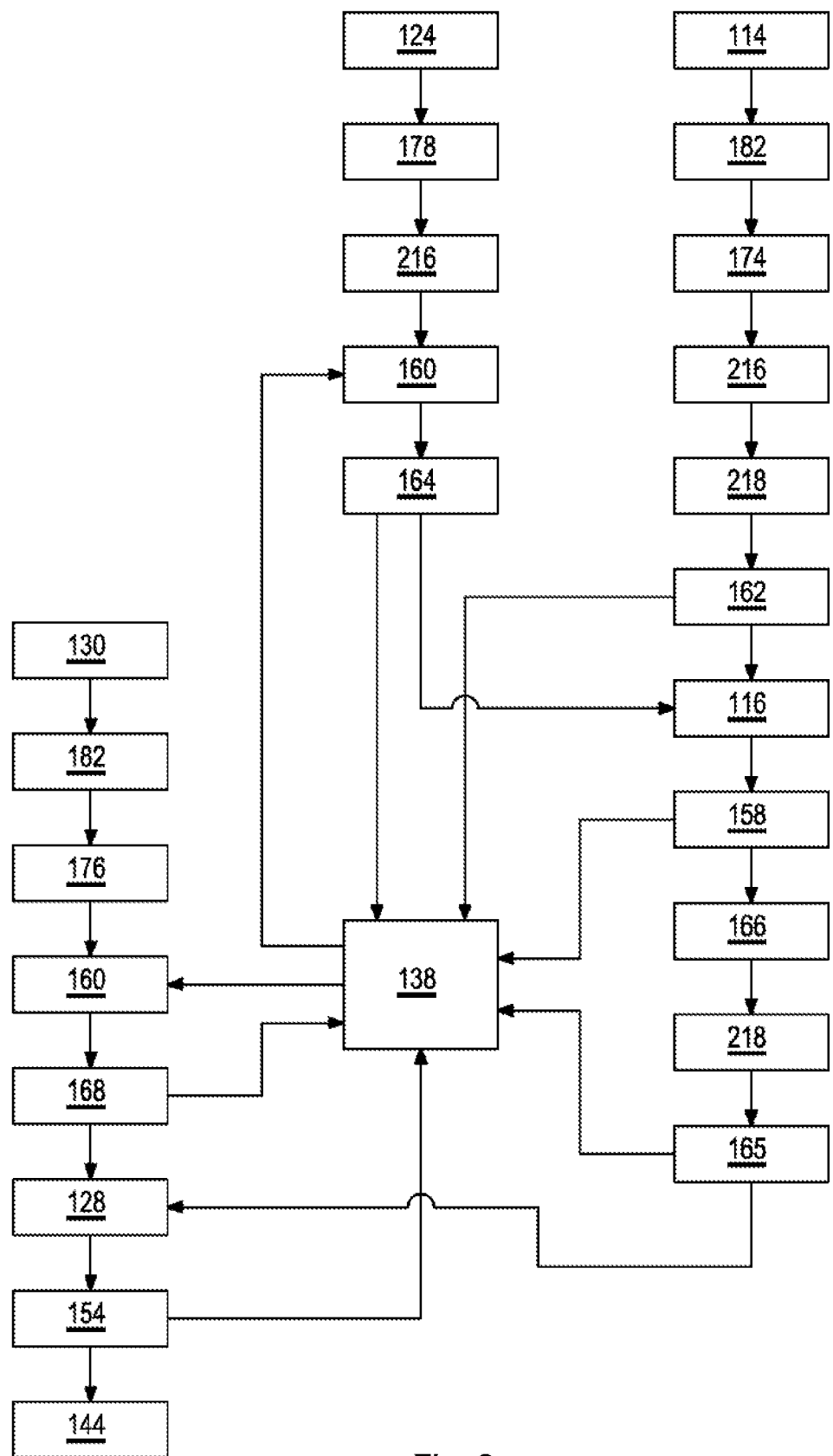
FIG. 6 shows a schematic illustration of a manufacturing system performing an embodiment of a method of producing a plurality of optical test strips.

In FIG. 6, a schematic illustration of a manufacturing system 110 performing an embodiment of a method of producing a plurality of optical test strips 146 is shown. In particular, starting in the upper right corner, the first layer web 114 may be provided. Similarly, as illustrated on the left side of FIG. 6, the second layer web 130 may be provided. Both the first layer web 114 and the second layer web 130 may be transported by using a plurality of rollers 182, such as vacuum rollers which may be configured for sucking in the respective web, e.g., the first layer web 114 and/or the second layer web 130, solely on a side opposing the first sides 118 and 132, e.g., on a side opposing the first electrode layer 120 and the second electrode layer 134 respectively. By a rotational movement of the rollers 182, the layer webs 114 and 130 may be transported within the manufacturing system 110. As an example, for the vacuum rollers, a vacuum-operated microporous surface material or perforated stainless steel surface with throttle nozzles underneath may be used, specifically by completely sucking in and transporting the layer webs 114 and 130. As an example, one supply reel 140 may comprise up to 1000 m of one of the first layer web 114, the second layer web 130 and the spacer layer web 124. Further, the manufacturing system 110 may be configured for processing up to 50 m/min of the first layer web 114 and/or the second layer web 130 and/or the spacer layer web 124.

In the method, at least part of the layer webs 114 and 130 may be removed by an edge trimming, such as to position each of the electrode layers 120 and 134, specifically the metal layer 208 and the detection layer 210, at an edge of the layer webs 114 and 130. This edge trimming may be performed in at least one cutting station 172. Specifically, the first layer web 114 may be cut in a first cutting station 174 and the second layer web 130 may be cut in a second cutting station 176. The layer webs 114 and 130 may particularly be guided in a wrap at an angle of 10° into the cutting stations 174 and 176, respectively. A cutting angle of α=30° may be used for cutting the layer webs 114 and 130, such as to generate a desired width, wherein damages and spallings may be avoided.

The raw spacer layer web 124 may comprise protective liners on its upper and lower adhesive surfaces. A front face and an end face of the spacer layer web 124 may however be exposed to contamination and may thus be cut in the spacer layer cutting station 178, such as in a kiss-cut station, in order to remove possibly contaminated areas. The spacer layer cutting station 178 may further be configured for cutting the spacer layer web 124 such that in a subsequent process in the manufacturing system, the protective liners may be fully or partially removed, e.g., peeled off, and stored on the liner residue rolls 196. This removing and/or peeling off may however lead to an electrical charging of the spacer layer web 124. Thus, before being fed into the first lamination station 116, the spacer layer web 124 may have to be electrically discharged by using the electrostatic discharge station 194, e.g., for neutralizing the surface of the spacer layer web 124 and for preventing electrical charges from accumulating in the sample application zone 214. Failure to do so may lead to an unusable and/or faulty analytical test strip 146 since the electrical charges accumulated in the sample application zone 214 may prevent the sample from entering the transverse capillary and/or the sample application zone 214.

The sample application zone 214 may be subject to an extremely narrow manufacturing tolerance of 0±0.1 mm. In particular, the functionality of the analytical test strip 146 may be dependent on the precise relative positioning of the first layer 198 and the second layer 204, specifically of the first electrode 200 and the second electrode 206. However, the first and second electrodes 200 and 206, specifically the metal layers 208 and the detection layer 210, may be easily damaged when touched. Thus, positioning the first layer web 114 and the second layer web 130 via an edge guide may not be allowed.

Subsequently to passing the cutting station 172, e.g., the respective first cutting station 174 or spacer layer cutting station 176, the first layer web 114 and the spacer layer web 124 may each be transported by at least one draw roller 216. The draw roller 216 may specifically be configured for keeping a constant tensile stress within the layer webs. Additionally, the first layer web 114 may further pass over at least one vacuum table 218, specifically in order to guide the first layer web 124 in a stable planar arrangement. The vacuum table 218 may for example comprise diagonally standing wheels for guiding the first layer web 114, specifically on a side opposing the first layer edge 122, e.g., on a side opposing the side later becoming part of the sample application zone 214. The at least one first layer sensor 162, such as an infrared sensor, may then detect the position of the first layer edge 122 of the first layer web 114 and may provide information on the position to the control device 138. Specifically, the position of the first layer edge 122 may be used as a master position. The position of the spacer layer edge 126 of the spacer layer web 124 may be used as a slave position and may thus be adapted according to the master position of the first layer edge 122. In particular, the control device 138 may be configured for controlling, e.g., by tilting, the roller 160 in order to adapt the position of the spacer layer web 124 according to the position of the first layer web 114, e.g., to adapt the position of the spacer layer edge 126 according to the position of the first layer edge 122. The adapted position of the spacer layer web 124, e.g., of the spacer layer edge 126, may then be detected by using the at least one spacer layer sensor 164, e.g., an infrared sensor. Information on the position of the spacer layer edge 126 may, again, be provided to the control device 138. Subsequently, both the first layer web 114 and the spacer layer web 124 may be fed into the first lamination station 116. As an example, when being fed into the first lamination station 116, the spacer layer web 124 may, as an example, still have the protective liner attached on the side opposing the side laminated to the first layer web 114. The at least one offset sensor 158, such as a camera, may then be used for detecting the offset between the first layer web 114 and the spacer layer web 124. Additionally or alternatively, the offset may be detected by using a laser sensor, wherein the laser sensor may be arranged such that the laser points in a direction transverse and/or perpendicular to the direction of travel and/or transport of the laminate web generated in the first laminate station 116. Again, the information on the offset may be provided to the control device 138.

The laminate web 166 generated this way may then pass over a further vacuum table 218 and the position of the laminate web 166 may be controlled by using the at least one laminate sensor 165 before being fed into the second lamination station 128. The position of the second layer web 130, specifically of the second layer edge 136 of the second layer web 130, before being fed into the second lamination station 128, may be controlled similarly to the position of the spacer layer web 124. Thus, the position of the laminate web 166 may be used as a master position and the position of the second layer web 130, as a slave position, may be adapted according to the master position of the laminate web 166. In particular, the control device 138 may be configured for controlling, e.g., by tilting, the roller 160 in order to adapt the position of the second layer web 130 such that the second layer web 130 may be aligned with the first layer web 114, specifically such that the second layer edge 136 may be aligned with the first layer edge 122. The adapted position of the second layer web 130, e.g., of the second layer edge 136, may then be detected by using the at least one second layer sensor 168, e.g., an infrared sensor. Information on the detected position of the second layer edge 136 may then, again, be provided to the control device 138.

Subsequently to passing the second lamination station 128, the alignment sensor 154 for detecting the alignment between the second layer edge 136 and the first layer edge 122 may be used for controlling the position of the second layer edge 136. The analytical test strip web 144 may then be ready to be stored on the storage device 142.

LIST OF REFERENCE NUMBERS 110 manufacturing system
112 supplying device
114 first layer web
116 first lamination station
118 first side of first layer web
120 first electrode layer
122 first layer edge
124 spacer layer web
126 spacer layer edge
128 second lamination station
130 second layer web
132 first side of second layer web
134 second electrode layer
136 second layer edge
138 control device
140 supply reel
142 storage device
144 analytical test strip web
145 splicing station
146 analytical test strip
148 step i.
150 step ii.
152 step iii.
154 alignment sensor
156 roller
158 offset sensor
160 roller
162 first layer sensor
164 spacer layer sensor
165 laminate sensor
166 laminate web
168 second layer sensor
170 substep of providing a continuous raw first layer web to cutting station
172 cutting station
174 first cutting station
176 second cutting station
178 spacer layer cutting station
180 cutting blade
182 roller
184 substep of generating a continuous analytical test strip web
186 printing station
187 substep of using a fault detection station 188 fault detection station
190 laser
192 substep of disposing web sections marked as faulty
194 electrostatic discharge station
196 liner residue roll
198 first layer
200 first electrode
202 spacer layer
204 second layer
206 second electrode
208 metal layer
210 detection layer
212 enzyme
214 sample application zone
216 draw roller
218 vacuum table

What is claimed is:

1. A method of producing a plurality of analytical test strips by using a reel-to-reel process, each analytical test strip comprising a first layer having a first electrode, a spacer layer, and a second layer having a second electrode, the method comprising:
   i. providing a continuous first layer web, having disposed on a first side a first electrode layer, each analytical test strip being formed extending laterally of the first layer web, the first layer web having a continuous first layer edge corresponding to dosing ends of the produced analytical test strips;
   ii. continuously disposing, in at least one first lamination station, a continuous spacer layer web onto the first side of the first layer web, wherein the spacer layer web has a spacer layer edge, wherein the disposing of the spacer layer web relative to the first layer web is based on the relative lateral position of the spacer layer edge to the first layer edge, the disposing of the spacer layer being position-controlled in a master-slave fashion by using a position of the first layer edge as a first master position and a position of the spacer layer edge as a first slave position,
      wherein the disposing takes place such that the spacer layer edge is offset a fixed distance from the first layer edge and that, thereby, a portion of the first side of the first layer and a portion of the first electrode layer remain uncovered by the spacer layer web; and
   iii. continuously disposing, in at least one second lamination station, a continuous second layer web onto the spacer layer web, the second layer web having disposed on a first side a second electrode layer, wherein the disposing is performed such that the second electrode layer faces the first layer web,
   wherein the second layer web has a second layer edge, wherein the disposing of the second layer web relative to the first layer web is based on the relative lateral position of the second layer edge to the first layer edge, and takes place such that the second layer edge is aligned with the first layer edge,
   wherein the disposing of the second layer web is position-controlled in a master-slave fashion by using a position of the second layer edge as a second slave position;
   wherein in the master-slave fashion the slave position is adapted according to the master position; and
   separating the test strips.

2. The method according to claim 1, wherein step iii is performed such that the position of the first layer edge is used as the master position.

3. The method according to claim 1, further comprising detecting, by using at least one alignment sensor downstream the second lamination station, an alignment between the second layer edge and the first layer edge and controlling the position of the second layer edge of the continuous second layer web being fed into the second lamination station.

4. The method according to claim 3, wherein the alignment sensor comprises at least one optical distance sensor having a sensing direction essentially parallel to a plane of extension of the first layer web.

5. The method according to claim 4, wherein the at least one optical distance sensor has a sensing direction onto and/or perpendicular to the first layer edge and the second layer edge.

6. The method according to claim 3, wherein the alignment sensor comprises at least one laser sensor.

7. The method according to claim 6, wherein the at least one laser sensor is a laser profile sensor.

8. The method according to claim 3, wherein the alignment sensor is a superordinate sensor.

9. The method according to claim 3, wherein deviations in alignment between the first layer edge and the second layer edge are at least partially corrected by correcting the position of the second layer edge of the continuous second layer web being fed into the second lamination station.

10. The method according to claim 1, further comprising detecting, by using at least one off-set sensor downstream the first lamination station, an offset between the spacer layer edge and the first layer edge and controlling a position of the spacer layer edge of the continuous spacer layer web being fed into the first lamination station.

11. The method according to claim 1, further comprising detecting, by using at least one first layer sensor, the position of the first layer edge of the continuous first layer web being fed into the first lamination station.

12. The method according to claim 1, further comprising detecting, by using at least one spacer layer sensor, the position of the spacer layer edge of the continuous spacer layer web fed into the first lamination station.

13. The method according to claim 1, further comprising detecting, by using at least one laminate sensor, the position of the first layer edge of a continuous intermediate laminate web generated in step ii., the laminate web comprising the first layer web and the spacer layer web, the laminate web being fed into the second lamination station.

14. The method according to claim 1, further comprising detecting, by using at least one second layer sensor, the position of the second layer edge of the continuous second layer web being fed into the second lamination station.

15. The method according to claim 1, wherein the first layer web is provided to the first lamination station with the first side of the first layer web being oriented in an upward fashion.

16. The method according to claim 1, wherein the continuous second layer web is fed into the second lamination station with the first side of the second layer web facing downward.

17. The method according to claim 1, wherein the continuous first layer web is fed into the first lamination station via a plurality of rollers, wherein the first side faces away from the rollers, wherein the continuous second layer web is fed into the second lamination station via a plurality of rollers, wherein the first side faces away from the rollers.

18. The method according to claim 1, wherein the controlled disposing of the spacer layer web on the first layer web, and the controlled disposing of the second layer web on the spacer layer web by the master-slave control method creates a defined sample application zone having a controlled and defined depth.

19. A manufacturing system for producing a plurality of analytical test strips by using a reel-to-reel process, each analytical test strip comprising at least one first layer having at least one first electrode, at least one spacer layer and at least one second layer having at least one second electrode, the manufacturing system comprising:
  I. at least one supplying device for providing at least one continuous first layer web, the first layer web having disposed on a first side at least one first electrode layer, the first layer web having a first layer edge corresponding to dosing ends of the produced analytical test strips;
  II. at least one first lamination station, the first lamination station being configured for continuously disposing at least one continuous spacer layer web onto the first side of the first layer web, each analytical test strip being formed extending laterally of the first layer web, wherein the spacer layer web has a spacer layer edge, wherein the disposing is position-controlled in a master-slave fashion by using a position of the first layer edge as a master position and a position of the spacer layer edge as a slave position, wherein the disposing of the spacer layer web relative to the first layer web is based on the relative lateral position of the spacer layer edge to the first layer edge, takes place such that the spacer layer edge is offset from the first layer edge and that, thereby, a portion of the first side of the first layer and a portion of the first electrode layer remain uncovered by the spacer layer web; and
  III. at least one second lamination station, the second lamination station being configured for continuously disposing at least one continuous second layer web onto the spacer layer web, the second layer web having disposed on a first side at least one second electrode layer, wherein the disposing is performed such that the second electrode layer faces the first layer web, wherein the second layer web has a second layer edge, wherein the disposing of the second layer web relative to the first layer web is based on the relative lateral position of the second layer edge to the first layer edge, and takes place such that the second layer edge is aligned with the first layer edge, and wherein the disposing is position-controlled in a master-slave fashion by using a position of the second layer edge as a slave position;
wherein in the master-slave fashion the slave position is adapted according to the master position.

* * * * *